United States Patent [19]

Araki et al.

[11] Patent Number: 5,440,672

[45] Date of Patent: Aug. 8, 1995

[54] APPARATUS FOR AUTOMATICALLY GENERATING AND ADJUSTING FUZZY REASONING RULES BASED ON REASONING ERROR AND METHOD THEREFOR

[75] Inventors: Shoichi Araki; Hiroyoshi Nomura; Isao Hayashi; Noboru Wakami, all of Osaka, Japan

[73] Assignee: Matsushita Electric Industrial Co., Ltd., Osaka, Japan

[21] Appl. No.: 897,359

[22] Filed: Jun. 11, 1992

[30] Foreign Application Priority Data

Jun. 12, 1991 [JP] Japan .................................. 3-140158

[51] Int. Cl.$^6$ .............................................. G05B 13/02
[52] U.S. Cl. .......................................... 395/51; 395/61; 395/900
[58] Field of Search ................... 395/3, 50, 51, 61, 900

[56] References Cited

U.S. PATENT DOCUMENTS

| | | | |
|---|---|---|---|
| 4,837,725 | 6/1989 | Yamakawa | 395/3 |
| 5,134,568 | 7/1992 | Sainen | 395/900 |
| 5,179,634 | 1/1993 | Matsunaga | 395/900 |
| 5,191,638 | 3/1993 | Wakami et al. | 395/900 |
| 5,241,651 | 8/1993 | Ueda | 395/61 |
| 5,267,348 | 11/1993 | Someya | 395/900 |
| 5,295,061 | 3/1994 | Katayama | 395/61 |
| 5,347,615 | 9/1994 | Yamakawa et al. | 395/51 |

OTHER PUBLICATIONS

T. Takagi et al., *Fuzzy Identification of Systems and Its Application to Modeling and Control*, IEEE Transactions on Systems Man, and Cybernetics, vol. SMC–15, No. 1, pp. 116–132 (1985).
M. Sugeno et al., Structure Identification of Fuzzy Model, Fuzzy Sets and Systems, 28, pp. 15–33, North Holland, 1988.
H. Ichihashi, Iterative Fuzzy Modeling and Hierarchical Network, Proceedings of 4th IFSA Congress, Brussels, pp. 49–51, 1991.
H. Nomura et al., A Self-Tuning Method of Fuzzy Control by Descent Method, Proceedings of 4th IFSA Congress, Brussels, pp. 155–158 (1991).
Linkens et al., "Self–Organizing Fuzzy Logic Control for Real Time Processes", Int'l Conf. on Control, Mar. 25–28, 1991, vol. 2, pp. 971–976.
Langari et al., "Self–Organizing Fuzzy Linguistic Control with Application to Arc Welding", IEEE Int'l Workshop on Intelligent Robots & Systems, Jul. 1990, pp. 1007–1014.
Ichihashi, "Iterative Fuzzy Modeling and Hierarchical Network", Proc. of 4th IFSA Congress, Brussels, 1991, pp. 49–51.
Nomura et al., "A Self–Tuning Method of Fuzzy Control by Descent Method", Proc. of 4th IFSA Congress, Brussels, 1991, pp. 155–158.

*Primary Examiner*—Allen R. MacDonald
*Assistant Examiner*—Stuart B. Shapiro
*Attorney, Agent, or Firm*—Willian Brinks Hofer Gilson & Lione

[57] ABSTRACT

An apparatus and method for automatically generating and adjusting fuzzy reasoning, rules based on changes in the reasoning error. The apparatus includes a fuzzy reasoning section that performs fuzzy logic based on the fuzzy reasoning rules stored in the a rule memory. The parameters of the fuzzy reasoning rules are adjusted in a parameter tuning section based on the output of the fuzzy reasoning section and predetermined input and output data. A reasoning error calculation section calculates a reasoning error and a change in the reasoning error based on the results from the fuzzy reasoning section and the predetermined input and output data. The reasoning error calculation section also disables the parameter tuning section when the calculated reasoning error is less than a predetermined first threshold value. When the calculated reasoning error is greater than or equal to the predetermined threshold value and the change in the reasoning error is less than a predetermined second threshold value, a rule generation section generates one or more fuzzy reasoning rules and regenerates the fuzzy reasoning rules stored in the rule memory based on the new fuzzy reasoning rule(s) so that optimal fuzzy reasoning rules are obtained.

6 Claims, 21 Drawing Sheets

R10 : Rectangular 0-2-5-3
R11 : Rectangular 3-5-8-6
R20 : Rectangular 1-7-8-6
R21 : Rectangular 2-8-7-1

X : Newly inputted data

APPARATUS FOR AUTOMATICALLY GENERATING AND ADJUSTING FUZZY REASONING RULES BASED ON REASONING ERROR AND METHOD THEREFOR

BACKGROUND OF THE INVENTION

1. Field of the Invention

The present invention relates generally to an apparatus for automatically generating and adjusting fuzzy reasoning rules and a method therefor, and more particularly, to an apparatus for automatically generating and adjusting fuzzy reasoning rules which is controlled based on a reasoning error and its change, and a method therefor.

2. Description of the Related Art

Recently, as household electric appliances have been equipped with conventional fuzzy reasoning apparatuses, there has been developed an automatic tuning apparatus for automatically and adjusting fuzzy reasoning rules without manually operating it.

As an example of such an automatic tuning method of automatically generating and adjusting fuzzy reasoning rules, there is proposed an iterative fuzzy modeling disclosed in, Hiroyoshi NOMURA et al., "A Self-Tuning Method of Fuzzy Control by Descent Method," Proc. of 4th IFSA Congress, Brussels, pp. 155–158, 1991. This method enables an embodied apparatus to adjust values of parameters in fuzzy reasoning rules, automatically, at a high speed, so that an error between an output determined by the reasoning rules and predetermined output data can be minimized.

However, the above-mentioned self-tuning method determines the number of fuzzy partitions in an input space or the number of fuzzy reasoning rules by trial and error, and adjusts the parameters for a fixed number of rules. Therefore, it is necessary to repeatedly perform an experiment many times so as to obtain a better result. Further, if the method has determined the parameters using earlier data and tries to further adjust the reasoning rules using currently obtained data, it damages the earlier tuning results or the earlier reasoning rules since the number of rules is fixed, resulting in not obtaining a better result.

SUMMARY OF THE INVENTION

An essential object of the present inventions is therefore to provide an apparatus for automatically generating and adjusting fuzzy reasoning rules, capable of obtaining an optimal fuzzy reasoning rules.

Another object of the present invention is to provide an apparatus for automatically generating and adjusting fuzzy reasoning rules, capable of adjusting values of parameters in the fuzzy reasoning rules based on input and output data, sequentially generating the rules, so as to obtain an optimal fuzzy reasoning rules.

A further object of the present inventions is to provide a method for automatically generating and adjusting fuzzy reasoning rules, capable of obtaining an optimal fuzzy reasoning rules.

A still further object of the present invention is to provide a method for automatically generating and adjusting fuzzy reasoning rules, capable of adjusting values of parameters in the fuzzy reasoning rules based on input and output data, sequentially generating the rules, so as to obtain an optimal fuzzy reasoning rules.

In order to achieve the aforementioned objective, according to one aspect of the present inventions, there is provided an apparatus for automatically generating fuzzy reasoning rules, comprising:

rule storage means for storing fuzzy reasoning rules representing relationships between input data and output data, each of said fuzzy reasoning rules being composed of antecedents and consequents;

fuzzy reasoning means for performing a fuzzy reasoning process based on fuzzy reasoning rules stored in said rule storage means and outputting results of said fuzzy reasoning process;

parameter tuning means for adjusting parameters of said fuzzy reasoning rules stored in said rule storage means, based on the results of said fuzzy reasoning process outputted from said fuzzy reasoning means and predetermined input and output data;

reasoning error calculation means for calculating a reasoning error and a change in the reasoning error based on the results of said fuzzy reasoning process outputted from said fuzzy reasoning means and said predetermined input and output data, and for disabling said parameter tuning means to operate when said calculated reasoning error is smaller than a predetermined first threshold value; and rule generation means for newly generating fuzzy reasoning rules and renewing the fuzzy reasoning rules stored in said rule storage means using said newly generated fuzzy reasoning rule when said reasoning error calculated by said reasoning error calculation means is equal to or larger than said predetermined first threshold value and said change in the reasoning error calculated by said reasoning error calculation means is smaller than a predetermined second threshold value.

According to another aspect of the present invention, there is provided an apparatus for automatically generating fuzzy reasoning rules, comprising:

rule storage means for storing fuzzy reasoning rules representing relationships between input data and output data, each of said fuzzy reasoning rules being composed of antecedents and consequents;

fuzzy reasoning means for performing a fuzzy reasoning process based on fuzzy reasoning rules stored in said rule storage means and outputting results of said fuzzy reasoning process;

region selection means for selecting a region for newly generating fuzzy reasoning rules for inputted input and output data, said region being defined by input data and output data;

data selection means for omitting input and output data belonging to regions other than the regions selected by said region selection means;

local parameter tuning means for adjusting parameters of said fuzzy reasoning rules located in the regions selected by said region selection means, based on the results of said fuzzy reasoning process outputted from said fuzzy reasoning means and predetermined input and output data;

local rule generation means for newly generating fuzzy reasoning rules in the regions selected by said region selection means and renewing the fuzzy reasoning rules stored in said rule storage means using said newly generated fuzzy reasoning rule; and reasoning error calculation means for calculating a reasoning error based on the results of said fuzzy reasoning process outputted from said fuzzy reasoning means and said predetermined input and output data, and for disabling said parameter tuning means to operate when said calculated reasoning error is smaller than a predetermined first threshold value.

According to a further aspect of the present invention, there is provided an apparatus for automatically generating fuzzy reasoning rules, comprising:

rule storage means for storing fuzzy reasoning rules representing relationships between input data and output data, each of said fuzzy reasoning rules being composed of antecedents and consequents;

fuzzy reasoning means for performing a fuzzy reasoning process based on fuzzy reasoning rules stored in said rule storage means and outputting results of said fuzzy reasoning process;

reasoning result display means for displaying the results of said fuzzy reasoning process outputted from said fuzzy reasoning means;

user input means for inputting instructions for alternating the results of said fuzzy reasoning process displayed by said reasoning result display means;

user rule generation means for newly generating fuzzy reasoning rules in response to said instructions inputted by said user input means;

user parameter tuning means for adjusting parameters of said fuzzy reasoning rules newly generated by said user rule generation means; and reasoning error calculation means for calculating a reasoning error based on the results of said fuzzy reasoning process outputted from said fuzzy reasoning means and said instructions inputted by said user input means, and for disabling said parameter tuning means to operate when said calculated reasoning error is smaller than a predetermined first threshold value.

According to a still further aspect of the present invention, there is provided an apparatus for automatically generating fuzzy reasoning rules, comprising:

rule storage means for storing fuzzy reasoning rules representing relationships between input data and output data, each of said fuzzy reasoning rules being composed of antecedents and consequents;

fuzzy reasoning means for performing a fuzzy reasoning process based on fuzzy reasoning rules stored in said rule storage means and outputting results of said fuzzy reasoning process;

parameter tuning means for adjusting parameters of said fuzzy reasoning rules stored in said rule storage means, based on the results of said fuzzy reasoning process outputted from said fuzzy reasoning means and predetermined input and output data;

reasoning error calculation means for calculating a reasoning error and a change in the reasoning error based on the results of said fuzzy reasoning process outputted from said fuzzy reasoning means and said predetermined input and output data, and for disabling said parameter tuning means to operate when said calculated reasoning error is smaller than a predetermined first threshold value;

rule display means for displaying said fuzzy reasoning rules stored in said rule storage means; and rule generation request means for enabling said rule display means to displaying requesting to an operator newly generating fuzzy reasoning rules when said reasoning error calculated by said reasoning error calculation means is equal to or larger than said predetermined first threshold value and said change in the reasoning error calculated by said reasoning error calculation means is smaller than a predetermined second threshold value.

According to a still more further aspect of the present invention, there is provided a method for automatically generating fuzzy reasoning rules, including the steps of:

performing a fuzzy reasoning process based on fuzzy reasoning rules representing relationships between input data and output data stored in rule storage means and outputting results of said fuzzy reasoning process, each of said fuzzy reasoning rules being composed of antecedents and consequents;

adjusting parameters of said fuzzy reasoning rules stored in said rule storage means, based on the results of said fuzzy reasoning process and predetermined input and output data;

calculating a reasoning error and a change in the reasoning error based on the results of said fuzzy reasoning process and said predetermined input and output data, and terminating a process for generating fuzzy reasoning rules when said calculated reasoning error is smaller than a predetermined first threshold value; and newly generating fuzzy reasoning rules and renewing the fuzzy reasoning rules stored in said rule storage means using said newly generated fuzzy reasoning rule when said calculated reasoning error calculated is equal to or larger than said predetermined first threshold value and said change in the calculated reasoning error is smaller than a predetermined second threshold value.

BRIEF DESCRIPTION OF THE DRAWINGS

These and other objects and features of the present inventions will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present inventions will be described below with reference to the attached drawings.

First preferred embodiment

Figure 1:
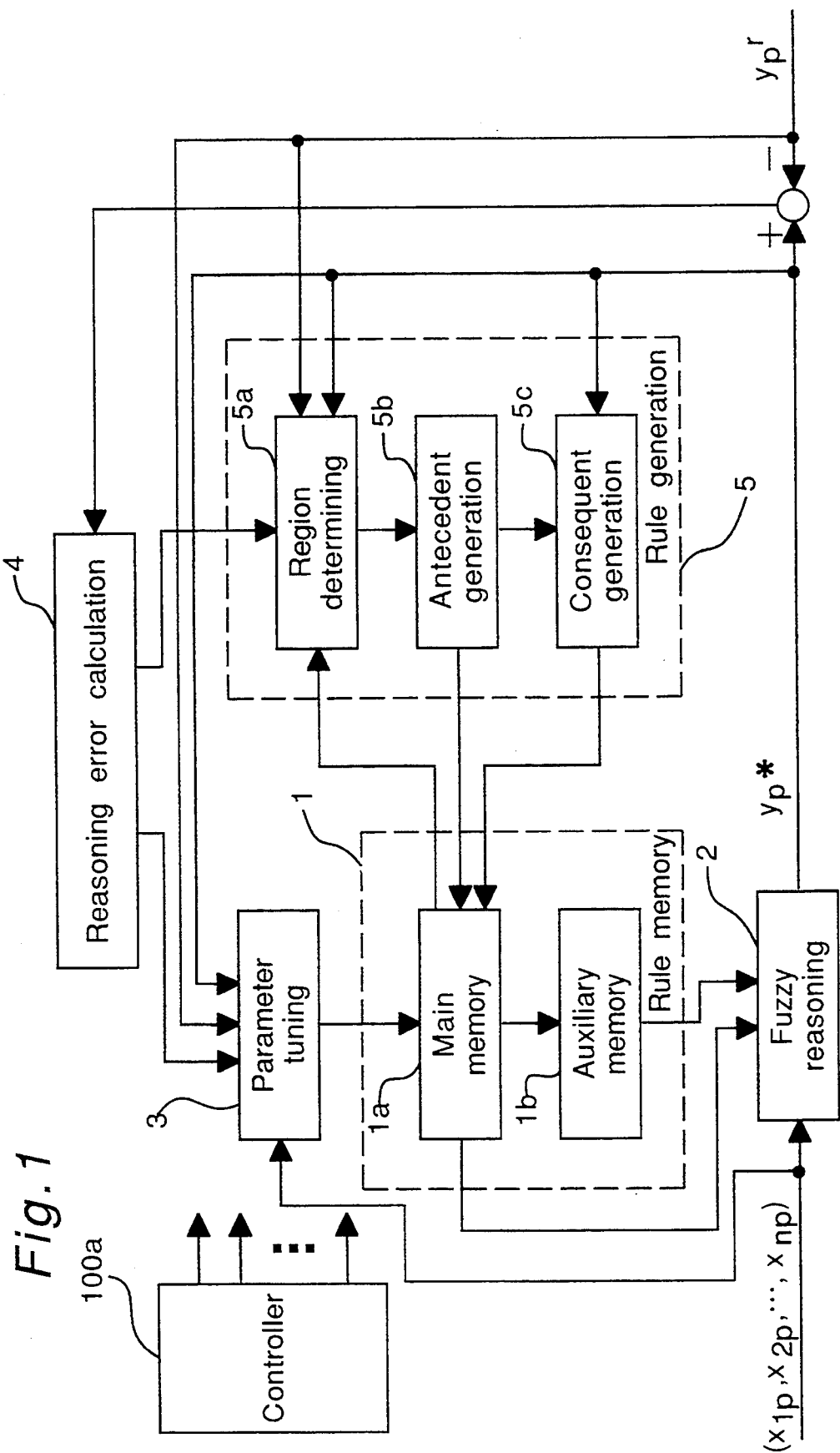
FIG. 1 is a schematic block diagram showing an apparatus for automatically generating fuzzy reasoning rules of a first preferred embodiment according to the present invention.

FIG. 1 shows an apparatus for automatically generating fuzzy reasoning rules of a first preferred embodiment according to the present invention.

Referring to FIG. 1, a controller 100a executes general operations and controls respective sections provided in the apparatus shown in FIG. 1. There are further provided in the first preferred embodiment, (a) a rule memory 1 for storing fuzzy reasoning rules;

(b) a fuzzy reasoning section 2 for performing a fuzzy reasoning process based on input data according to the fuzzy reasoning rules stored in the rule memory 1;

(c) a parameter tuning section 3 for adjusting parameters of the fuzzy reasoning rules stored in the rule memory 1 based on predetermined input and output data and the output from the fuzzy reasoning section 2;

(d) a reasoning error calculation section 4 for calculating a reasoning error and a change in the reasoning error (referred to as its change hereinafter) using given output data and output from the fuzzy reasoning section 2 and for disabling the parameter tuning section 3 when the calculated reasoning error is smaller a predetermined threshold value Ta1; and (e) a rule generation section 5 for newly generating fuzzy reasoning rules when the reasoning error calculated by the reasoning error calculation section 4 is equal to or larger than the predetermined value Ta1 and its change is equal to or smaller than a predetermined threshold value Ta2.

The rule memory 1 comprises (a) a main memory 1a for storing generated reasoning rules, and (b) an auxiliary memory 1b for storing the fuzzy reasoning rules stored in the main memory 1a prior to renewal thereof by the rule generation section 5.

The rule generation section 5 comprises (a) a region determining section 5a for determining a region for newly generating fuzzy reasoning rules using the membership functions of antecedents of rules stored in the rule main memory 1a based on the reasoning error calculated by each region of the antecedents formed by the membership functions from the output of the fuzzy reasoning section 2 and predetermined output data;

(b) an antecedent generation section 5b for newly generating membership functions for the region determined by the region determining section 5a and renewing the antecedents of the fuzzy reasoning rules stored in the main memory 1a; and (c) a consequent generation section 5c for renewing consequents of the fuzzy reasoning rules stored in the main memory 1a, using values of the parameters of the antecedents of the fuzzy reasoning rules renewed by the antecedent generation section 5b, based on the results of the fuzzy reasoning of the fuzzy reasoning section 2 which are obtained from the rules stored in the auxiliary memory 1b.

Figure 2A:
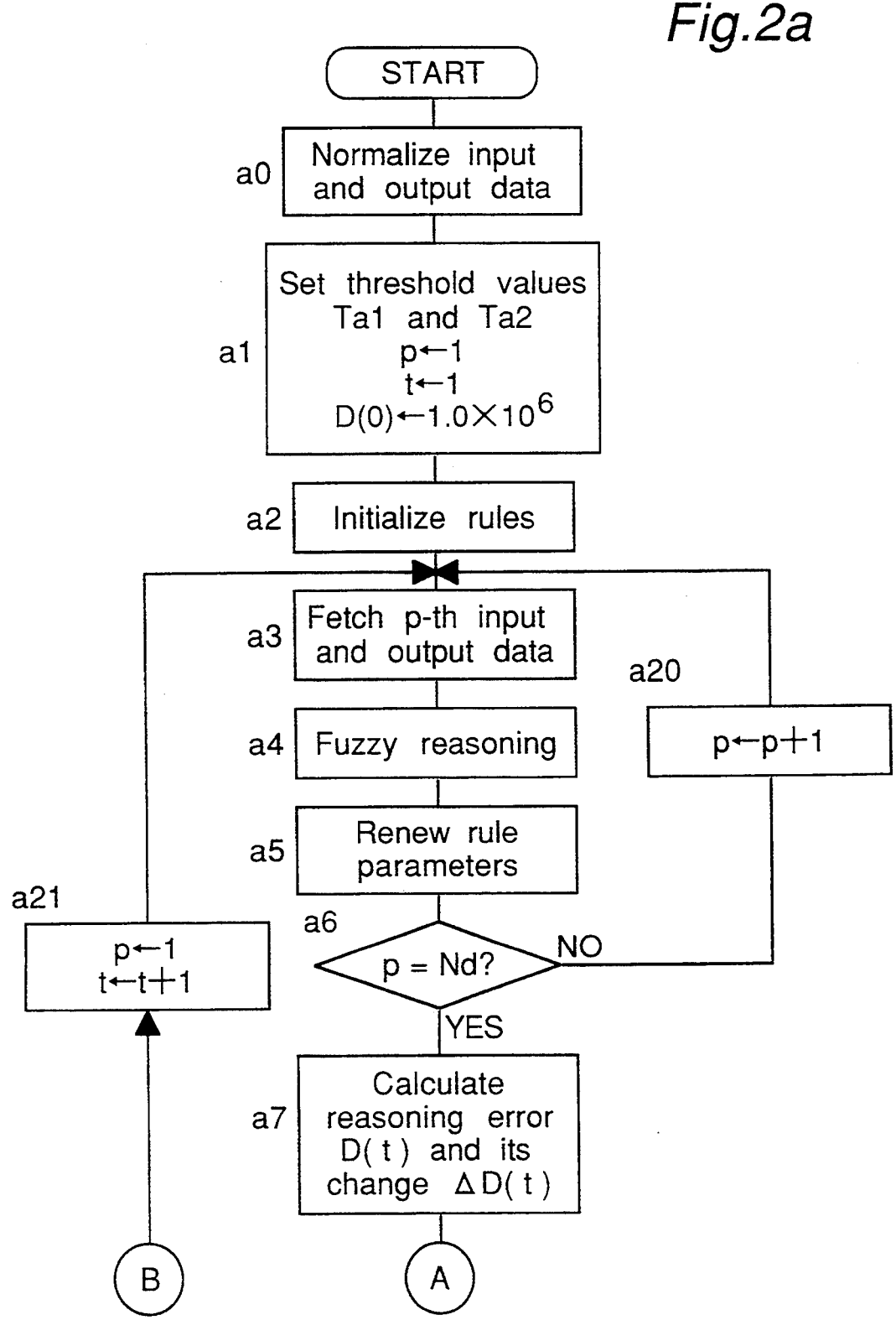
FIGS. 2a and 2b are flow charts showing an automatic rule generation and tuning process of the apparatus shown in FIG. 1.
Figure 2B:
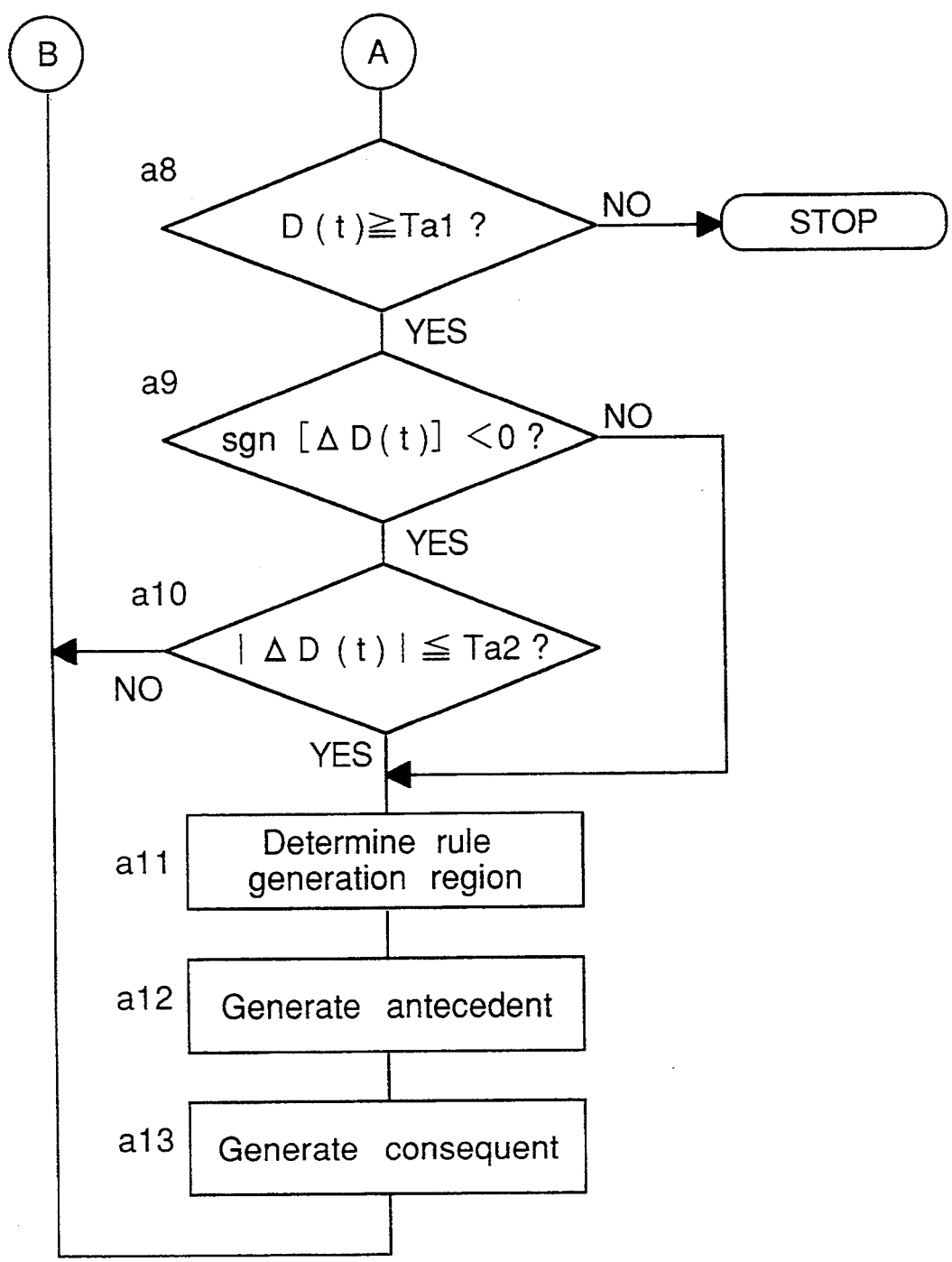

An operation of the apparatus of the first preferred embodiment constructed as described above will be described below, with reference to flow charts shown in FIGS. 2a and 2b. It is to be noted that the execution of each step is done by the controller 100a unless indicated.

Step a0

Step a0 normalizes each of input and output data ($x_{1p}, x_{2p}, \ldots, x_{np}, y_p^r$) ($p=1, 2, \ldots, Nd$; where Nd is a number of input and output data) so as to be fallen within an interval from $-1$ to 1 (referred to as $[-1, 1]$ hereinafter). The step a0 is performed in order to easily set membership functions and also easily set threshold values at the following step a1.

Step a0 may not be performed, and then, the automatic rule generation and tuning process may be started from the following step a1.

Step a1

Step a1 sets the threshold value Ta1 for terminating the operation of the parameter tuning section 3 and the threshold value Ta2 for starting the operation of the rule generation section 5. At step a1, further, a data number p of the input and output data is initially reset to one, and also a serial number t of tuning cycles is initially reset to one. Furthermore, an initial value D(0) of the reasoning error D(t) is set to a positive value of, for example, $1.0 \times 10^6$ which is enough larger than the first reasoning error D(1).

Step a2

Step a2 initializes fuzzy reasoning rules stored in the rule main memory 1a. The fuzzy reasoning rules used in the first preferred embodiment according to the present inventions are in general expressed by the following forms:

$R^0$: IF $x_1$ is $A_{10}$ and $x_2$ is $A_{20}$ and ... and $x_n$ is $A_{n0}$
  THEN y is $w_0$, $R^1$: IF $x_1$ is $A_{10}$ and $x_2$ is $A_{20}$ and ... and $x_n$ is $A_{n1}$
  THEN y is $w_1$, $R^k$: IF $x_1$ is $A_{1j}1$ and $x_2$ is $A_{2j}2$ and ... and $x_n$ is $A_{nj}n$
THEN y is $w_k$, $R^{N-1}$: IF $x_1$ is $A_{1m}1$ and $x_2$ is $A_{2m}2$ and ... and $x_n$
is $A_{nm}n$ THEN y is $w_{N-1}$ (1).

where n is a number of input variables,
$R^k$ is the k-th fuzzy reasoning rule,
$A_{ij}^i$ (i=1, 2, ..., n; $j^i$=0, 1, 2, ..., $s^i$, ..., $m^i$) is the $J^i$-th membership function in a domain of the i-th input variable, and
$w_k$ is a real value.

Further, a rule serial number k is determined by the following equation:

$$k = j^1(m^2 + 1)(m^3 + 1)...(m^n + 1) + \quad (2)$$
$$j^2(m^3 + 1)(m^4 + 1)...(m^n + 1) + ... +$$
$$j^{n-1}(m^n + 1) + j^n.$$

In the present embodiment, the membership function $A_{ij}i$ (i=1, 2, ..., n; $j^i$=0, 1, 2, ..., $s^i$, ..., $m^i$) is expressed as follows:

$$A_{iji}(x_i) = \begin{cases} \frac{1}{a_{iji} - a_{iji-1}}(x_i - a_{iji-1}), & \text{if } a_{iji-1} \leq x_i \leq a_{iji} \\ 1 - \frac{1}{a_{iji+1} - a_{iji}}(x_i - a_{iji}), & \text{if } a_{iji} \leq x_i \leq a_{iji+1} \\ 0, & \text{otherwise} \end{cases} \quad (3)$$

where $a_{ij}i < a_{ij}i+1$ for j=0, 1, ..., $m^i - 1$.

Figure 3:
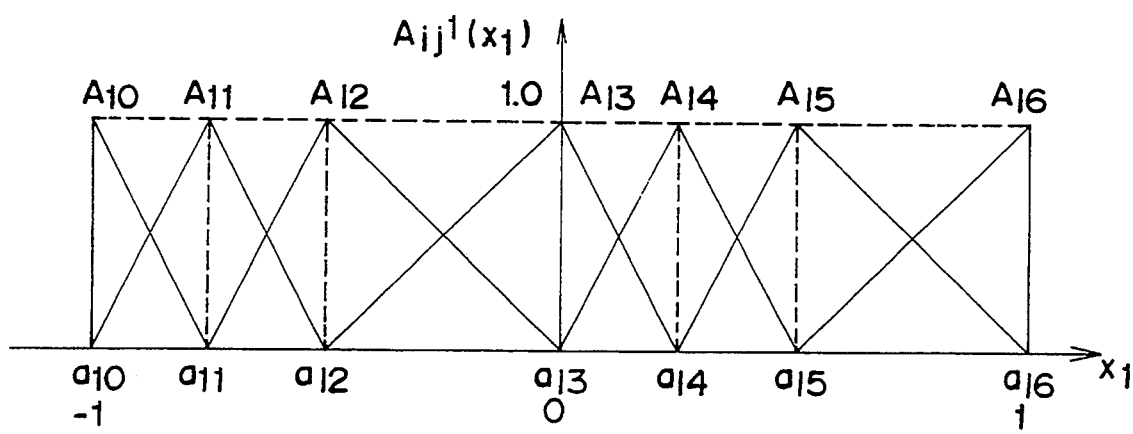
FIG. 3 is a graph showing examples of membership functions used in the apparatus shown in FIG. 1.
Figure 4:
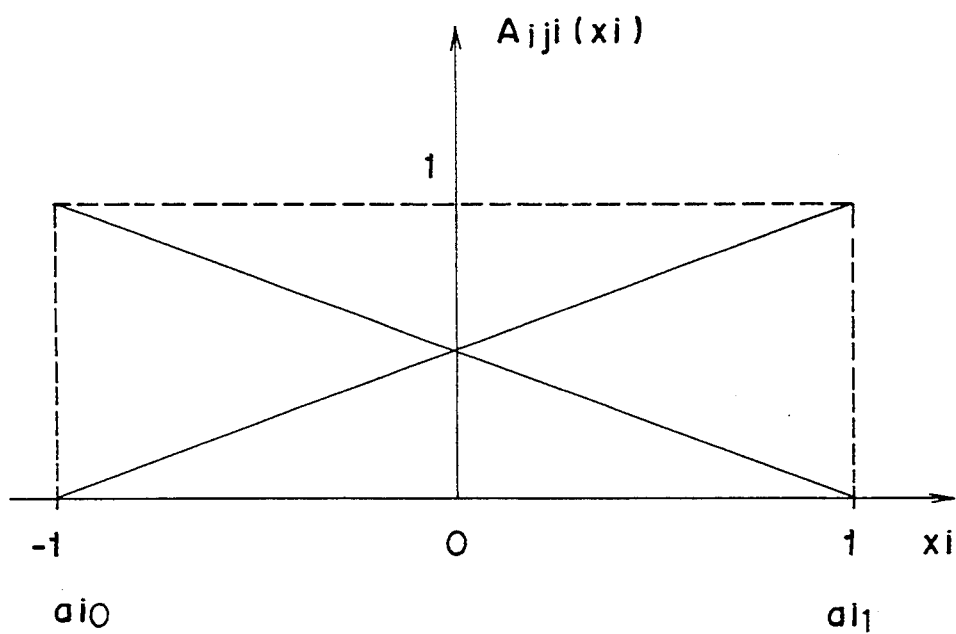
FIG. 4 is a graph showing membership functions used in an initial setting process of the apparatus shown in FIG. 1.

FIG. 3 shows an example of membership functions expressed by the above-mentioned equation (2). In the initial setting process of the fuzzy reasoning rules at step a2, there are set two antecedent membership functions $A_{ij}i$ for each variable $x_i$ as shown in FIG. 4, and also, the real values of all the consequents are initially set to zero. For example, if the number of input variables is three, the following $2^3$ fuzzy reasoning rules are initially stored in the main memory 1a;

$R^0$: IF $x_1$ is $A_{10}$ and $x_2$ is $A_{20}$ and $x_3$ is $A_{30}$
THEN y is $w_0 = 0$,
$R^1$: IF $x_1$ is $A_{10}$ and $x_2$ is $A_{20}$ and $x_3$ is $A_{31}$
THEN y is $w_1 = 0$,
$R^2$: IF $x_1$ is $A_{10}$ and $x_2$ is $A_{21}$ and $x_3$ is $A_{30}$
THEN y is $w_2 = 0$,
$R^3$: IF $x_1$ is $A_{10}$ and $x_2$ is $A_{21}$ and $x_3$ is $A_{31}$
THEN y is $w_3 = 0$,
$R^4$: IF $x_1$ is $A_{11}$ and $x_2$ is $A_{20}$ and $x_3$ is $A_{30}$
THEN y is $W_4 = 0$,
$R^5$: IF $x_1$ is $A_{11}$ and $x_2$ is $A_{20}$ and $x_3$ is $A_{31}$
THEN y is $w_5 = 0$,
$R^6$: IF $x_1$ is $A_{11}$ and $x_2$ is $A_{21}$ and $x_3$ is $A_{30}$
THEN y is $w_6 = 0$, and
$R^7$: IF $x_1$ is $A_{11}$ and $x_2$ is $A_{21}$ and $x_3$ is $A_{31}$
THEN y is $w_7 = 0$ (4).

Step a3

Step a3 fetches input and output data ($x_{1p}, x_{2p}, ..., x_{np}, y_p^r$) and stores them in the parameter tuning section 3. Further, the input data ($x_{1p}, x_{2p}, ..., x_{np}$) are stored in the fuzzy reasoning section 2.

Step a4

The fuzzy reasoning section 2 calculates output data $y_p^*$ for the input data ($x_{1p}, x_{2p}, ..., x_{np}$) by performing a fuzzy reasoning process expressed by the following equations:

$$\mu_k = A_{1j1}(x_{1p}) \cdot A_{2j2}(x_{2p}) \cdot ... \cdot A_{njn}(x_{np}), \quad (5)$$

$$y_p^* = \sum_{k=0}^{N-1} \mu_k \cdot w_k, \quad (6)$$

where $\mu_k$ denotes an adaptation of the antecedent of the fuzzy reasoning rule $R^k$. Since the rule number k is a function of the membership function $j^i$ as shown in the equation (2), the above-mentioned equation is expressed as follows:

$$y_p^* = \sum_{j^1} \sum_{j^2} ... \sum_{j^n} A_{1j1}, A_{2j2}, ..., A_{njn}, w_{f(j1,j2,...,jn)}, \quad (7)$$

where a function relationship between k and $j^i$ expressed by the equation (2) is presented as follows:

$$k = f(j^1, j^2, ..., j^n).$$

Step a5

The parameter tuning section 3 renews the values of the parameters $a_{ij}i$ and $w_k$ of the fuzzy reasoning rules stored in the rule main memory 1a.

In the present preferred embodiment, there is assumed the following error evaluation function E that expresses a reasoning error or a difference between the output data $y_p^r$ and the output $y_p^*$ from the fuzzy reasoning section 2:

$$E = \frac{1}{2}(y_p^* - y_p^r)^2. \quad (8)$$

The parameter tuning section 3 renews the values of parameters $a_{ij}$ and $w_k$ using a method of steepest descent so that the value of the evaluation function E becomes the minimum thereof as follows:

$$w_k \leftarrow w_k - K_w \frac{\partial E}{\partial w_k}, \quad k = 0,1,2, ..., N-1, \quad (9)$$

$$a_{iji} \leftarrow a_{iji} - K_a \frac{\partial E}{\partial a_{iji}},$$

$$i=1, 2, ..., n; j^i=0, 1, 2, ..., s^i, ..., m^i \quad (10)$$

where $K_w$ and $K_a$ are predetermined constants, respectively. From the equations (5) and (6), $\delta E/\delta w_k$ is given as follows:

$$\frac{\partial E}{\partial w_k} = \frac{\partial}{\partial w_k}\left[\frac{1}{2}(y_p^* - y_p^r)^2\right] = \mu_k(y_p^* - y_p^r). \quad (11)$$

Further, when a parameter to be adjusted is expressed by $a_{is}^i$, $\delta E/\delta a_{ij}^i$ is obtained as follows. In the case of $a_{is}^i{}_{-1} \leq x_{ip} \leq a_{is}^i$, $A_{is}^i{}_{-1} + A_{is}^i = 1$. Therefore, $$\frac{\partial E}{\partial a_{isi}} = \frac{\partial E}{\partial y_p^*}\left(\frac{\partial y_p^*}{\partial A_{isi-1}} \cdot \frac{\partial A_{isi-1}}{\partial a_{isi}} + \frac{\partial y_p^*}{\partial A_{isi}} \cdot \frac{\partial A_{isi}}{\partial a_{isi}}\right) = \quad (12)$$

-continued $$(y_p^* - y_p')\left(\frac{\partial y_p^*}{\partial A_{isi}} - \frac{\partial y_p^*}{\partial A_{isi-1}}\right)\frac{\partial A_{isi}}{\partial a_{isi}} = (y_p^* - y_p') \times$$

$$\left[\left(\sum_{j^1}\sum_{j^2}\cdots\sum_{j^{i-1}}\sum_{j^{i+1}}\cdots\sum_{j^n} A_{1j1} \cdot A_{2j2} \cdot \ldots \cdot A_{iji-1} \cdot A_{iji+1} \cdot \ldots \cdot \right.\right.$$

$$\left.A_{njn} \times W_{f(j1,j2,\ldots,ji-1,si,ji+1,\ldots,jn)}\right) - \left(\sum_{j^1}\sum_{j^2}\cdots\sum_{j^{i-1}}\sum_{j^{i+1}}\cdots\right.$$

$$\left.\left.\sum_{j^n} A_{1j1} \cdot A_{2j2} \cdot \ldots \cdot A_{iji-1} \cdot A_{iji+1} \cdot \ldots \cdot A_{njn} \times \right.\right.$$

$$\left.\left.W_{f(j1,j2,\ldots,ji-1,si-1,ji+1,\ldots,jn)}\right)\right] \times \left(-\frac{A_{isi}}{a_{isi} - a_{isi-1}}\right)$$

Furthermore, in the case of $a_{is}^i \leq x_{ip} \leq a_{is}^i{}_{+1}$, $A_{is}^i + A_{is}^i{}_{+1} = 1$. Therefore, $$\frac{\partial E}{\partial a_{isi}} = \frac{\partial E}{\partial y_p^*}\left(\frac{\partial y_p^*}{\partial A_{isi}} \cdot \frac{\partial A_{isi}}{\partial a_{isi}} + \frac{\partial y_p^*}{\partial A_{isi+1}} \cdot \frac{\partial A_{isi+1}}{\partial a_{isi}}\right) = \quad (13)$$

$$(y_p^* - y_p')\left(\frac{\partial y_p^*}{\partial A_{isi}} - \frac{\partial y_p^*}{\partial A_{isi+1}}\right)\frac{\partial A_{isi}}{\partial a_{isi}} = (y_p^* - y_p') \times$$

$$\left[\left(\sum_{j^1}\sum_{j^2}\cdots\sum_{j^{i-1}}\sum_{j^{i+1}}\cdots\sum_{j^n} A_{1j1} \cdot A_{2j2} \cdot \ldots \cdot A_{iji-1} \cdot A_{iji+1} \cdot \ldots \cdot \right.\right.$$

$$\left.A_{njn} \times W_{f(j1,j2,\ldots,ji-1,gi,ji+1,\ldots,jn)}\right) - \left(\sum_{j^1}\sum_{j^2}\cdots\sum_{j^{i-1}}\sum_{j^{i+1}}\cdots\right.$$

$$\left.\left.\sum_{j^n} A_{1j1} \cdot A_{2j2} \cdot \ldots \cdot A_{iji-1} \cdot A_{iji+1} \cdot \ldots \cdot A_{njn} \times \right.\right.$$

$$\left.\left.W_{f(j1,j2,\ldots,ji-1,gi+1,ji+1,\ldots,jn)}\right)\right] \times \left(-\frac{A_{isi}}{a_{isi+1} - a_{isi}}\right).$$

Step a6

Step a6 compares the data-number p and the number Nd of the input and output data. If the data number p is not equal to the number Nd of the input and output data (NO at step a6), the data number p is incremented by one at step a20, and then, the flow goes back to step a3. Thereafter, the processes from step a3 to step a5 are repeatedly performed until the data number p is equal to the number Nd. A series of processes from step a3 to step a6 and step a20 is referred as-a tuning cycle.

On the other hand, when the data number p is equal to or larger than the number Nd, the flow goes to step a7.

Step a7

The reasoning error calculation section 4 calculates the reasoning error D(t) and its change ΔD(t) using the following equations:

$$D(t) = \frac{1}{N_d} \sum_{p=1}^{N_d} |y_p^* - y_p'|, \quad (14)$$

$$\Delta D(t) = D(t) - D(t-1). \quad (15)$$

D(t) expresses the reasoning error at the end of the t-th tuning cycle.

Step a8

In the reasoning error calculation section 4, step a8 compares the reasoning error D(t) with the threshold value Ta1 initially set at step a1. If the reasoning error D(t) is equal to or larger than Ta1 (YES at step a8), the flow goes to step a9. On the other hand, if the reasoning error D(t) is smaller than Ta1 (NO at step a8), it is judged that fuzzy reasoning rules with a desired accuracy have been obtained, and then, the reasoning error calculation section 4 terminates the operations of the parameter tuning section 3 and the rule generation section 5. Then, the automatic rule generation and tuning process is completed.

Step a9

Step a9 checks the sign of the change ΔD(t) in the reasoning error D(t). If the change ΔD(t) is positive or zero (NO at step a9), or if the reasoning error D(t) has increased, it is judged that the reasoning error D(t) does not decrease when using the current fuzzy reasoning rules, and then, the flow goes to step a11 which determines a region for newly generating fuzzy reasoning rules. On the other hand, if the change ΔD(t) is negative (YES at step a9), or if the reasoning error D(t) has decreased, the flow goes to step a10.

Step a10

Step a10 compares the absolute value |ΔD(t)| of the change in the reasoning error with the threshold value Ta2 initially set in step a1. If the value |ΔD(t)| is larger than the threshold value Ta2 (NO at step a10), the data number p is initially reset to one and also the serial number t is incremented by one at step a21, and then, the flow goes back to step a3. On the other hand, if the value |ΔD(t)| is equal to or smaller than the threshold value Ta2 (YES at step a10), it is Judged that the current fuzzy reasoning rules will no more decrease the reasoning error D(t), and then, the flow goes to step a11 which determines a region for newly generating fuzzy reasoning rules.

Step a11

At step a11, the region determining section 5a calculates the reasoning errors for every region divided by two membership functions adjacent to each other which are set for the same input variable $x_i$, based on the input and output data belonging to each region, selects a region corresponding to the maximum reasoning error as a region for newly generating fuzzy reasoning rules.

Figure 5:
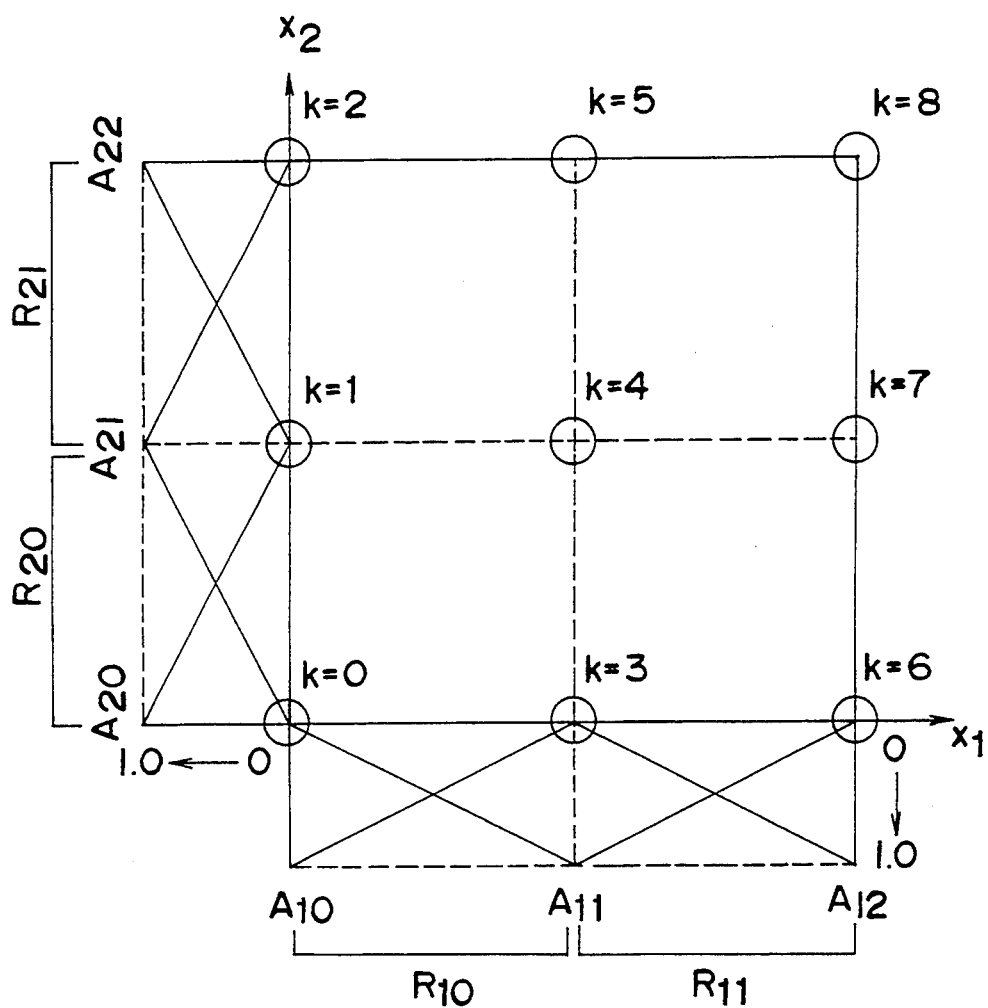
FIG. 5 is a graph showing regions for calculating reasoning errors in the apparatus shown in FIG. 1.

For example, if the number of input variables is 2 and there are set three membership functions for each variable, the reasoning errors are calculated for four regions composed of, $R_{10}$ and $R_{11}$ for the input variable $x_1$ and $R_{20}$ and $R_{21}$ for the variable $x_2$, as shown in FIG. 5 in FIG. 5, o denotes a fuzzy rule. It is to be noted that, when input data are located on a boundary line, the input data belong to all the regions including the boundary line.

Step a12

The antecedent generation section 5b first of all copies the fuzzy reasoning rules stored in the main memory 1a into the auxiliary memory 1b. The antecedent generation section 5b then generates new membership functions of the antecedents in the region determined at step a11 as shown in FIG. 6, and renews the number $j^i$ of the membership function of the antecedents of the fuzzy reasoning rule stored in the main memory 1a.

For example, first of all, fuzzy reasoning rules shown in FIG. 5 are transferred and stored into the auxiliary memory 1b. Thereafter, if a region $R_{10}$ shown in FIG. 5 is determined as the region in which fuzzy resoning rules are to be newly generated, a membership function is generated using, the value of the parameter $a_{ij}{}^i$ within a variable interval of the input variable $x_1$ so as to divide the region $R_{10}$ shown in FIG. 5 with equal intervals as shown in FIG. 6, the parameter number $j^i$ is renewed in a descending order of the value of the parameter $a_{ij}{}^i$, and then, the contents of the main memory 1a is renewed.

Figure 6:
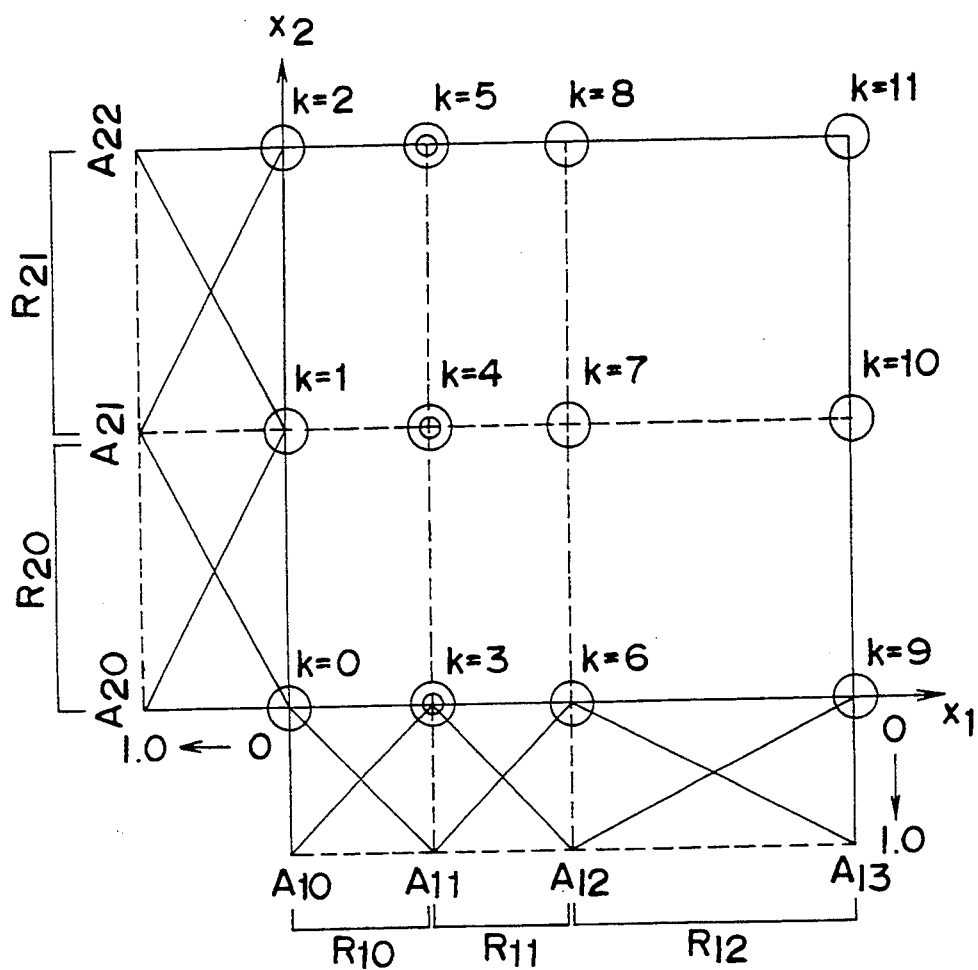
FIG. 6 is a graph showing an example of fuzzy reasoning rules generated by the apparatus shown in FIG. 1.

In this example, step a12 divides $R_{10}$ into two subregions renamed as $R_{10}$ and $R_{11}$ and renews the set $\{A_{10}, A_{11}, A_{12}\}$ of membership functions for the input variable $x_1$ in FIG. 5 into the set $\{A_{10}, A_{11}, A_{12}, A_{13}\}$ of new membership functions in FIG. 6 using the new parameters $a_{10}, a_{11}, a_{12}$, and $a_{13}$ corresponding to the renewed set of membership functions for the input variable $x_1$, thereby generating the antecedents of renewed fuzzy reasoning rules.

In step a12, there are set two membership functions for each variable at step a2, and when the flow goes to step a11 first, there is only one region where the reasoning error thereof is to be checked, for example, there is one rectangular region in the case of two input variable, also there is one rectangular-parallelepiped-shaped region. Therefore, a membership function for at least one input variable is generated.

In this example, step a12 adds only one membership function in the region determined at step a11, however, the present invention is not limited to this. Any number of membership functions may be generated. Further, the original region may be divided into any number of regions with non-equal intervals.

Step a13

The consequent generation section 50 performs a fuzzy reasoning process every rule using the fuzzy reasoning rules prior to the renewal thereof which have been copied into the auxiliary memory 1b at step a12, based on the values of the parameters of the antecedents of the fuzzy resoning rules renewed at step a12, and then, renews the rule number k of the real value $w_k$ of the consequents of the fuzzy resoning rules stored in the main memory 1a so that the fuzzy reasoning rules have the values of the parameters of the consequents of the resulting renewed contents, thereby generating and storing the consequents thereof in the main memory 1b. After generation of the consequents thereof, the data number p is reset to one and the number t is incremented by one at step a21, and then, the flow goes back to step a3.

When generating fuzzy reasoning rules using the processes of steps a12 and a13 as described above, the reasoning error does not increase prior to or after the renewal of the fuzzy reasoning rules. This means that the outputs of the renewed fuzzy resoning rules become the same as the original rules.

In other words with respect to the process of step a13, Let $R^k$: IF $x_1$ is $A_{1j}1$ and $x_2$ is $A_{2j}2$ and ... and $x_n$ is $A_{nj}n$ be the antecedent of k-th incomplete rule stored in the rule main memory. The consequent generation section 5c, first of all, activates the fuzzy reasoning section 2, which according to rules stored in the auxiliary rule section 1b calculates the reasoning result $w_k^*$ for the input data $(a_{1j}1, a_{2j}2, \ldots, a_{nj}n)$ for each rule number k. The consequent generation section 5c then determines the consequent of $R^k$ as THEN y is $w_k^*$.

An example of the fuzzy reasoning rule of one input and one output type will be described below.

Figure 7:
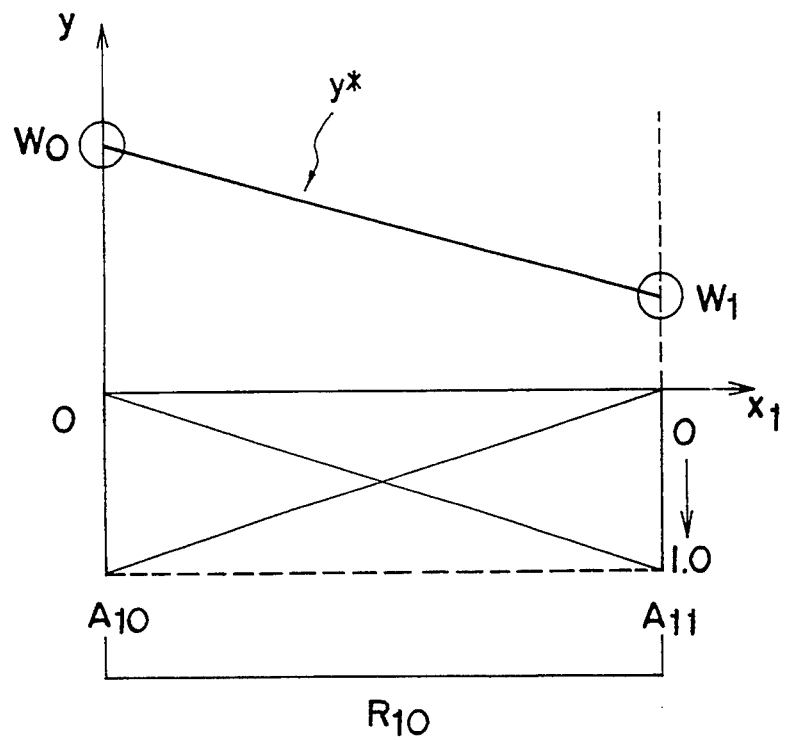
FIG. 7 is a graph showing an example of a region and membership functions prior to generation of rules in the apparatus shown in FIG. 1.

As a simple example, there is assumed two membership functions as shown in FIG. 7, then the fuzzy reasoning rules and the output $y^*$ thereof are given as follows:

$R^0$: IF $x_1 = A_{10}$ THEN $y = w_0$ $R^1$: IF $x_1 = A_{11}$ THEN $y = w_1$ (16), $y^* = (-x_1 + 1)w_0 + x_1 w_1$ (17).

Figure 8:
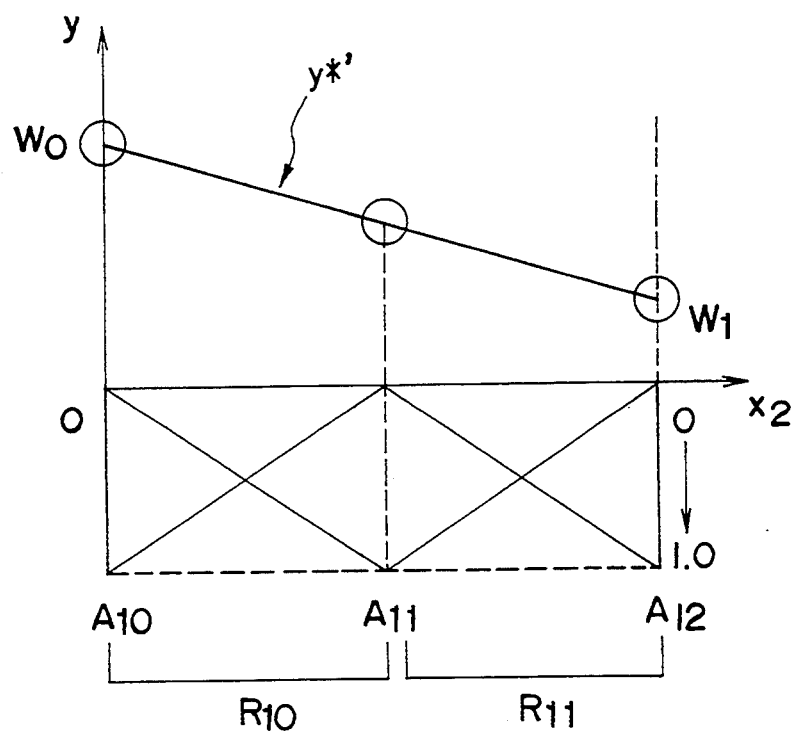
FIG. 8 is a graph showing an example of a region and membership functions after generation of rules in the apparatus shown in FIG. 1.

When one rule is added in the processes of steps a12 and a13 as shown in FIG. 8, the renewed resulting fuzzy resoning rules and the outputs $y^{*\prime}$ thereof for the new regions $R_{01}$ and $R_{02}$ are as follows:

$R^0$: IF $X_1 = A_{10}$ THEN $y = w_0$ $R^1$: IF $x_1 = A_{11}$ THEN $y = (w_0 + w_1)/2$ $R^2$: IF $x_1 = A_{12}$ THEN $y = w_1$ (18)

$y^{*\prime} = (-2x_1 + 1)w_0 2x_1(w_0 + w_1)/2 = (-x_1 + 1)w_0 + x_1 w_1$ (19)

if $x_1$ belongs to the new region $R_{10}$, and $y^{*\prime} = -2(x_1 - 1)(w_0 + w_1)/2 + 2(x_1 - 0.5)w_1 = (-x_1 + 1)w_0 + x_1 w_1$ (20)

if $X_1$ belongs to the new region $R_{11}$. Therefore, $y^* = y^{*\prime}$.

Thus, the reasoning error does not change prior to and after the renewal of the fuzzy reasoning rules for newly generating the new ones. Since the execution of Steps a12 and a13 increases the number of fuzzy reasoning rules without increasing the reasoning error, the reasoning error can be decreased by further adjusting their parameters.

According to the first preferred embodiment, the reasoning error $D(t)$ and its change $\Delta D(t)$ are checked by each of the regions divided by the membership functions, and the parameters of the fuzzy resorting rules are adjusted based on the input and output data sequentially generating rules in regions having larger resoning errors, resulting in automatically determining optimal fuzzy resoning rules and the values of the parameters thereof. Therefore, it is unnecessary to obtain the parameters of the fuzzy resoning rules by repeatedly performing experiments by trial and error, resulting in remarkably shortening the developing time thereof.

In the above-mentioned present preferred embodiment, there is used as the membership function, a linear function of the input variable. However, the present invention is not limited to this. There may be used any function provided that the sum of the values corresponding to each other of two membership functions, which are adjacent to each other and are provided for respective input variables of the antecedents, is equal to one. For example, a higher order membership function may be used. In this case, there can be generated fuzzy resoning rules capable of obtaining stronger non-linear output of the fuzzy reasoning with smaller number of parameters.

Also, the number of membership functions and the real values of the consequents of the fuzzy reasoning rules in the initial setting process can be set to any values, respectively. For example, when the number of membership functions and the real values of the consequents of the fuzzy reasoning rules in the initial setting process are set to values depending on the features of the input and output data, the generation time of the fuzzy reasoning rules can be shortened.

In the parameter tuning section 3 of the first preferred embodiment, the method of steepest descent is used. However, the present invention is not limited to this. There may be used the other kinds of non-linear optimization methods such as the conjugate gradient method, the quasi-Newton method or the like. When one of these non-linear optimization methods is used, the tuning speed can be heightened as compared with the conventional apparatuses, and it is unnecessary to perform a differential calculation in the parameter tuning section 3.

In the present preferred embodiment, the membership functions of the antecedents and the real values of the consequents are sequentially adjusted at the successive processes of steps a12 and a13. However, the present invention is not limited to this, either one of the membership functions of the antecedents and the real values of the consequents may be adjusted.

Figure 9:
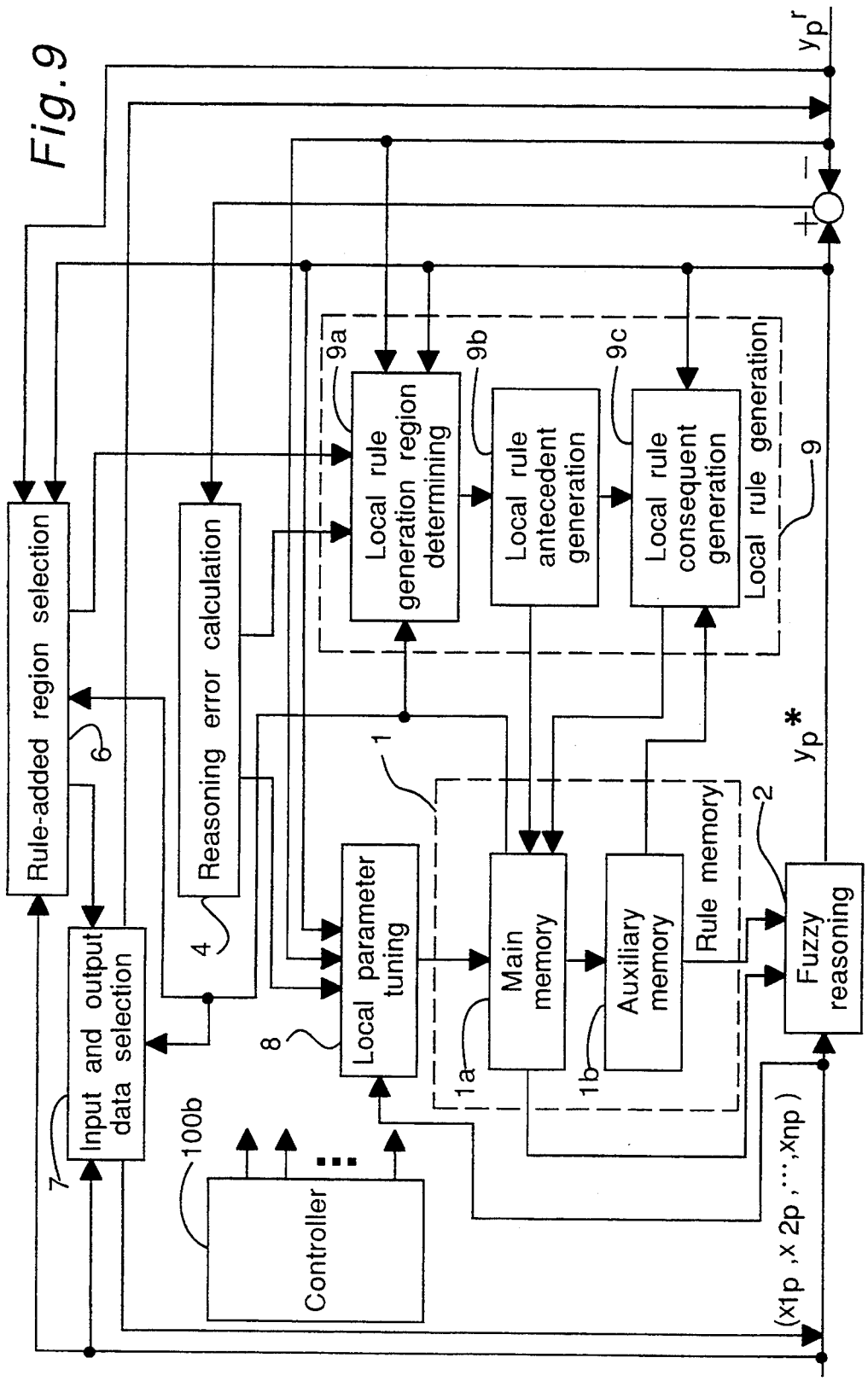
FIG. 9 is a schematic block diagram showing an apparatus for automatically generating fuzzy reasoning rules of a second preferred embodiment according to the present invention.

In the present preferred embodiment, the resoning error calculation section 4 judges whether or not the operation of the parameter tuning section 3 is to be terminated, however, the present invention is not limited to this. The number of the times of the tuning may be previously set prior to start of the tuning process, Second preferred embodiment FIG. 9 shows a composition of an apparatus for automatically generating fuzzy reasoning rules of a second preferred embodiment according to the present invention. In FIG. 9, sections similar to those shown in FIG. 1 are denoted by the same numerals as those shown in FIG. 1.

As is apparent from comparison between FIGS. 1 and 9, differences between the first and second preferred embodiments are as follows: there are further provided in the second preferred embodiment, (a) a rule-added region selection section 6 for selecting regions for newly generating fuzzy reasoning rules for newly given input and output data, based on the reasoning error calculated by the reasoning error calculation section 4 for each of the regions of the antecedents divided from the outputs of the fuzzy reasoning section 2 for newly applied input data and newly given output data, with reference to the membership functions of the antecedents stored in the main memory 1a;

(b) an input and output data selection section 7 for excluding or removing input and output data belonging to the regions not selected by the rule-added region selection section 6 with reference to the membership functions of the antecedents of the fuzzy reasoning rules stored in the main memory 1a, and for further outputting the other input and output data belonging to the selected regions to the fuzzy resoning section 2;

(c) a local parameter tuning section 8 for adjusting only the parameters of the fuzzy reasoning rules stored in the rule memory 1 after being newly generated in the regions selected by the rule-added region selection section 6, based on the outputs of the fuzzy resoning section 2 outputted when the data selected by the input and output data selection section 7 are inputted thereto and the output data selected by the input and output data selection section 7; and (d) a local rule generation section 9 for newly generating fuzzy reasoning rules only in the regions selected by the rule-added region selection section 6.

The local rule generation section 9 comprises (a) a local rule generation region determining section 9a for determining subregions located within the region by the rule-added region selection section 6, which are provided for newly generating fuzzy resoning rules calculated each of the regions of the antecedents divided based on the outputs of the fuzzy resoning section 2 and the output data, with reference to the membership function of the antecedents of the fuzzy resoning rules stored in the main memory 1a;

(b) a local rule antecedent generation section 9b for generating membership functions of the antecedents using values of the parameters representing the shape thereof, within the regions determined by the local rule generation region determining section 9a, and for renewing the antecedents of the fuzzy reasoning rules stored in the main memory 1a; and (c) a local rule consequent generation section 9c for renewing the values of the parameters of the consequents of the fuzzy reasoning rules stored in the main memory 1a, based on the results of the fuzzy resoning process performed by the fuzzy resoning section 2 using the rules stored in the auxiliary memory 1b, in response to the values of the parameters of the antecedents of the rules stored in the main memory 1a after being renewed by the local rule antecedent generation section 9b.

The operations of sections 8, 9a, 9b and 9c are the same as those of sections 3, 5a, 5b and 5c of the first preferred embodiment, respectively, except for such a fact that fuzzy reasoning rules to be generated in the second preferred embodiment are restricted to such rules that the domains of all the membership functions of their antecedents are within regions selected by the rule-added region selection section 6.

Figure 10A:
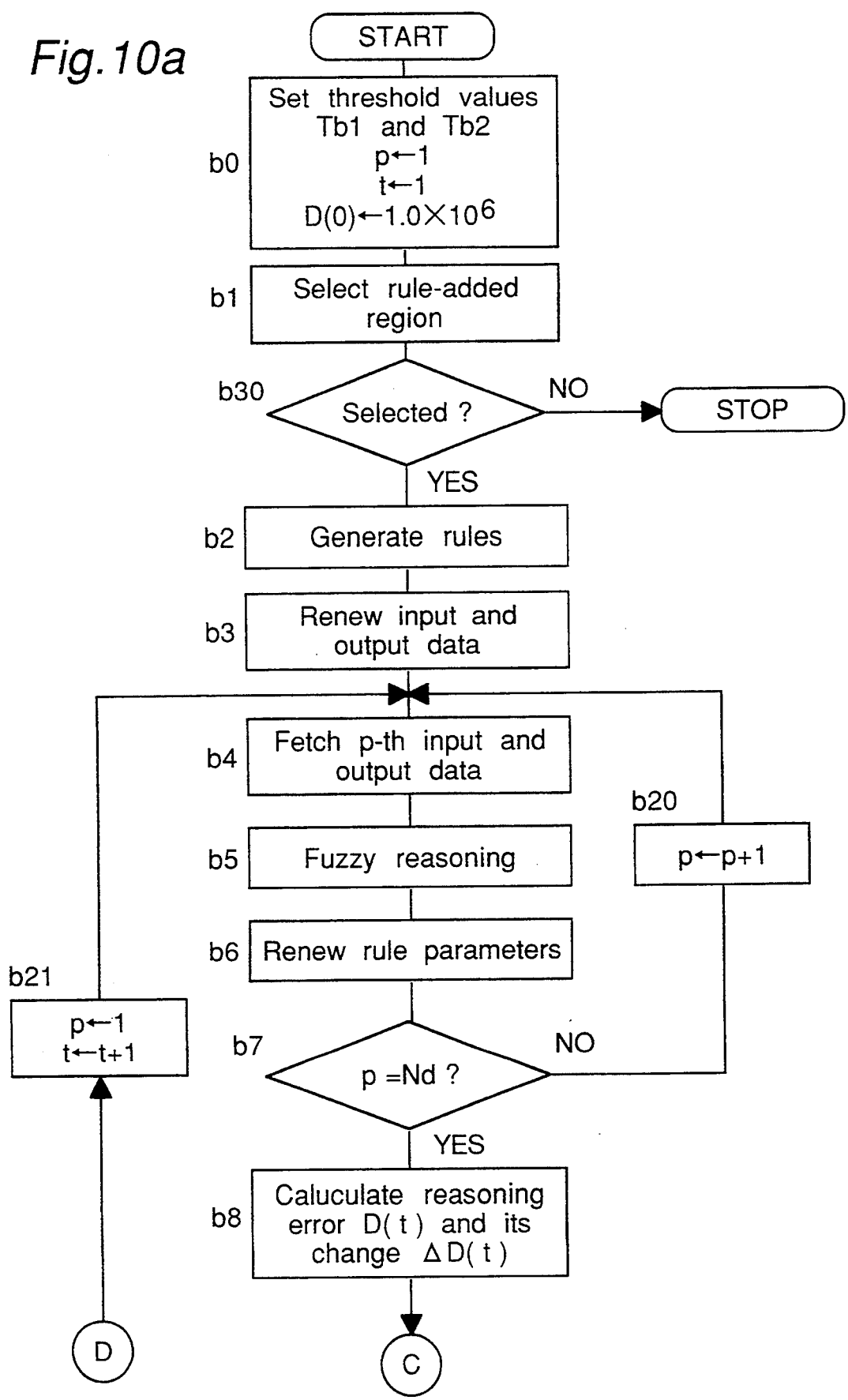
FIGS. 10a and 10b are flow charts showing an automatic rule generation and tuning process of the apparatus shown in FIG. 9.
Figure 10B:
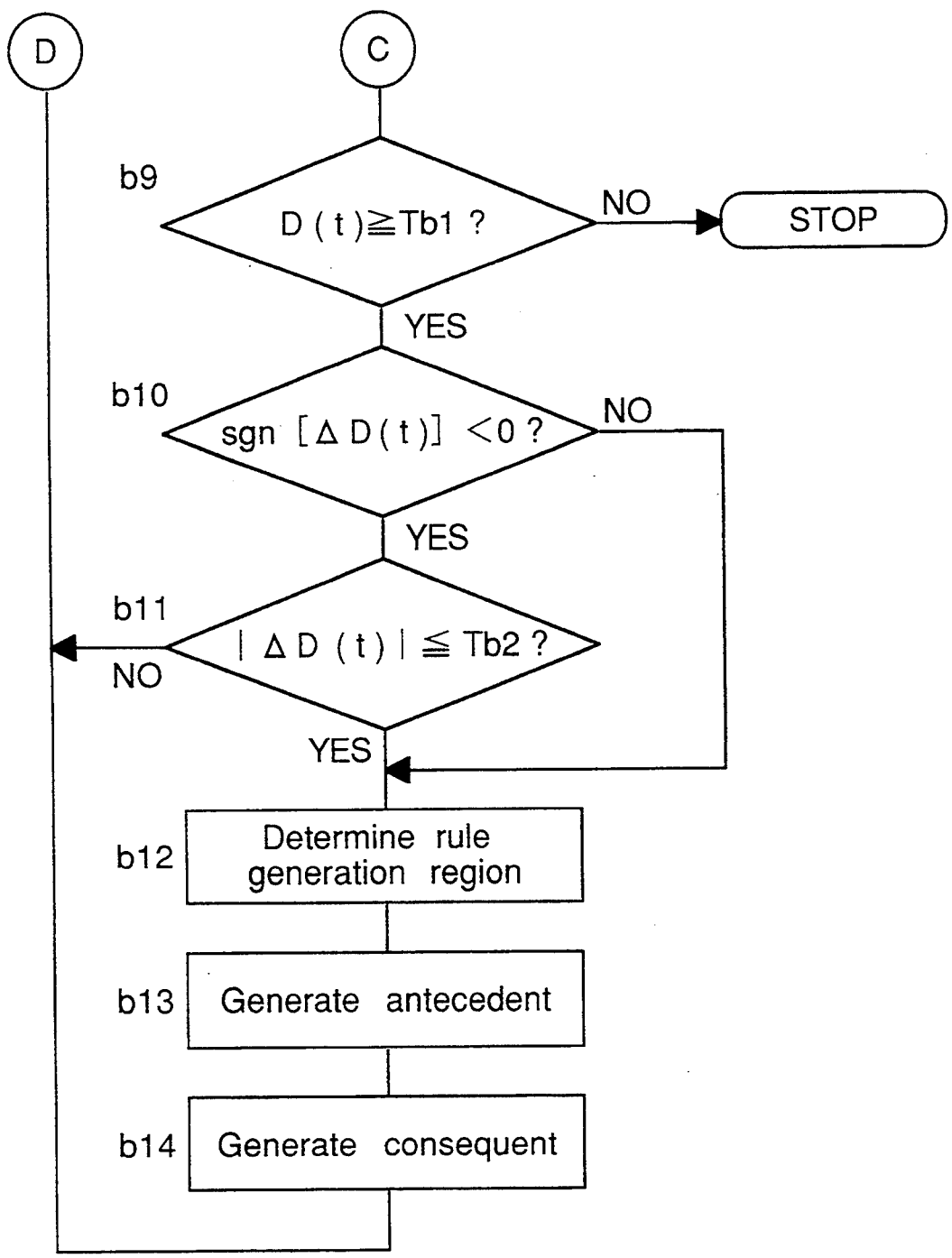

An automatic rule generation and tuning process executed by the apparatus shown in FIG. 9 will be described below with reference to flow charts shown in FIGS. 10a and 10b. It is to be noted that there is further provided a controller 100b for controlling the respective sections shown in FIG. 9, and the controller 100b performs respective processes of steps other than those performed by the sections indicated at the following steps.

Step b0 step b0 sets a threshold value Tb1 for terminating the operation of the local parameter tuning section 8, and also set a threshold value Tb2 for starting the operation of the local rule generation section 9. It is to be noted that the threshold value Tb1 is set to the same value as the threshold value Ta1 set at step a1 of the first preferred embodiment.

Further, at step b0, the data number p of the input and output data is initially reset to one, and the serial number t of the tuning cycle is initially reset to one. Furthermore, the initial value D(0) of the reasoning error D(t) is set to a larger positive value of $1.0 \times 10^6$ in a manner similar to that of the first preferred embodiment.

Step b1

The rule-added region selection section 6 calculates a reasoning error for newly given input and output data belonging to each of regions divided with two membership functions adjacent to each other which are set for respective input variables $x_i$ of the antecedents, using the fuzzy reasoning rules already stored in the main memory 1a, and further selects a region having a resoning error larger than the threshold value Tb1 as a region for newly generating fuzzy reasoning rules.

If any region having a resoning error larger than the threshold value Tb1 is not selected or there is no region having a resoning error larger than the threshold value Tb1 (No at step b30), the automatic rule generation and tuning process is completed. On the other hand, if selected, the flow goes to step b2.

Figure 11:
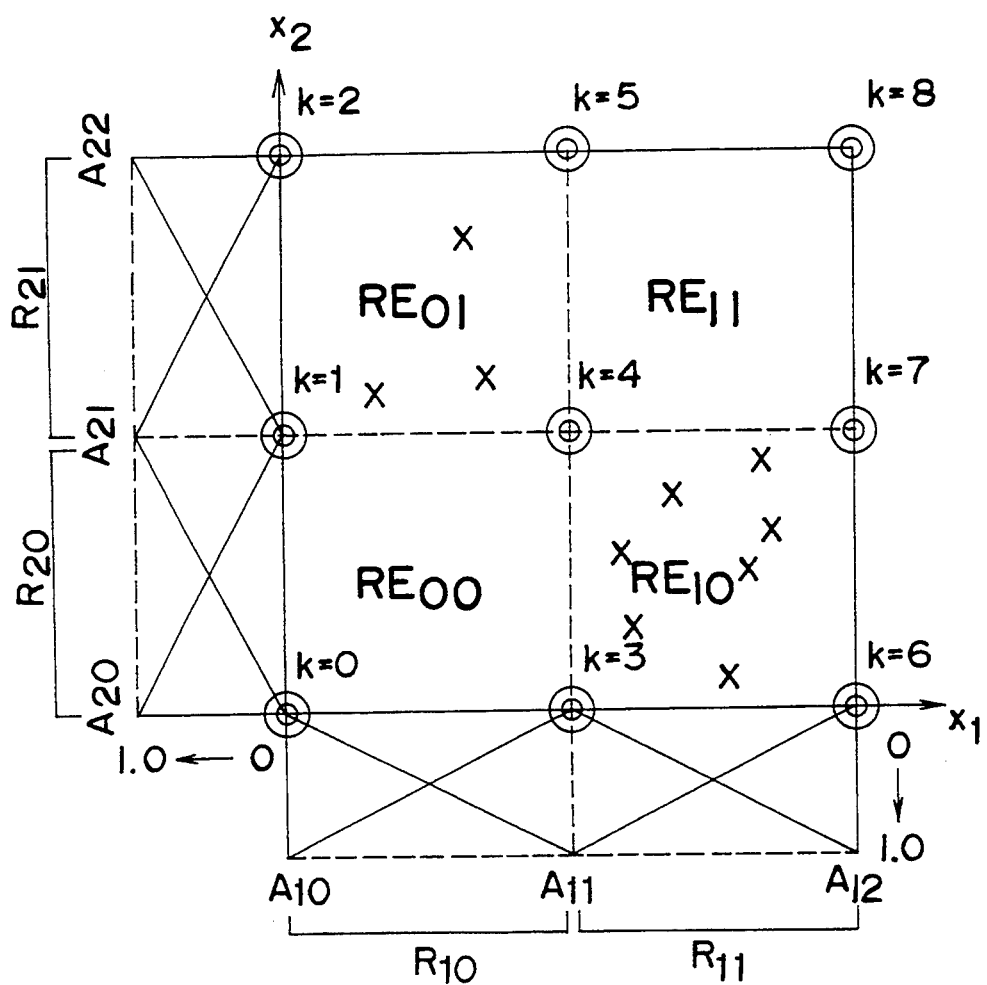
FIG. 11 is a graph showing regions for calculating reasoning errors used in the apparatus shown in FIG. 9.

The regions of the first preferred embodiment for generating rules and calculating reasoning errors are different from those of the second preferred embodiment. In the second preferred embodiment, for example, as shown in FIG. 11, if the number of input variables $x_i$ is 2 and there are three membership functions for each of the input variables $x_i$, the domain of input variables $x_i$ is partitioned into four regions $RE_{01}$, $RE_{01}$, $RE_{10}$ and $RE_{11}$ at step b1. In FIG. 11, ⊙ denotes a fuzzy resoning rule, and x denotes newly inputted data.

Step b2

The local rule generation section 9 generates new fuzzy reasoning rules in at least one region, such as the region having the largest reasoning error, among the regions selected at step b1. In this case, there is newly generated at least one membership function for each of the input variables $x_i$.

Figure 12:
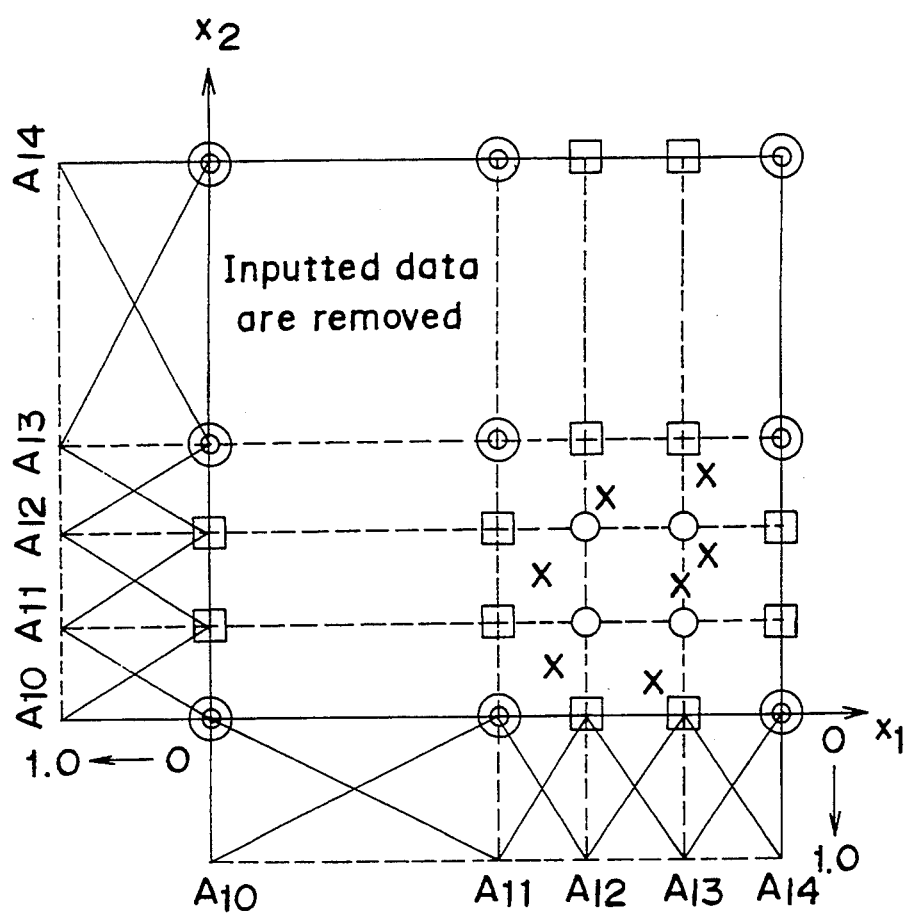
FIG. 12 is a graph showing an example of fuzzy reasoning rules generated by the apparatus shown in FIG. 9.

For example, if step b1 selects only the region $RE_{10}$ shown in FIG. 11, step b2 generates 16 new rules indicated by □ and ○ in FIG. 12. It is to be noted that ⊙ denotes already generated rule. In this case, step b2 generates two new membership functions for each of the input variables $x_i$. However, generally speaking, at least one membership function is generated for each of the input variables $x_i$.

Step b3

Step b3 renews the data number p of the input and output data belonging to the regions other than those selected at step b1. In this example, the input data belonging to the region $RE_{01}$ shown in FIG. 11 are removed as shown in FIG. 12.

The subsequent processes of steps b4 to b14 are performed basically in manners similar to those of steps a3 to a13 of the first preferred embodiment. The description of the processes of steps b4 to b14 is omitted therein.

Step b6

The local parameter tuning section 8 renews the parameters $w_k$ of fuzzy reasoning rules, wherein there is renewed only the parameters $w_k$ of the fuzzy reasoning rules which have been newly generated in the region selected at step b1, however, the parameters $w_k$ thereof located on the boundaries between respective regions are not renewed.

In this example shown in FIG. 12, the parameters $w_k$ of the four rules indicated by ○ are renewed, however, the parameters $w_k$ of the 12 rules indicated by □ are not renewed. Thus, the fuzzy resoning rules can be newly generated without changing the outputs of the fuzzy resoning in the other regions into which data are not inputted.

Step b12

The local rule generation region determining section 9a selects a region having a resoning error larger than the threshold value Tb1 as a region for newly generating fuzzy resoning rules among the regions selected at step b1 in a manner similar to that of step b1.

Step b13

The antecedent generation section 9b generates parameters of the antecedents of fuzzy reasoning rules to be newly generated in a manner similar to that of step a12.

Step b14

The consequent generation section 9c generates parameters of the consequents of fuzzy reasoning rules to be newly generated in a manner similar to that of step a13.

According to the second preferred embodiment, only the parameters of the generated fuzzy resoning rules other than the parameters located on the boundaries between respective regions are adjusted, sequentially generating the rules in only the regions respectively having larger resorting errors for the newly inputted data, thereby generating fuzzy reasoning rules without damaging the performance of the already generate rules.

Third preferred embodiment

Figure 13:
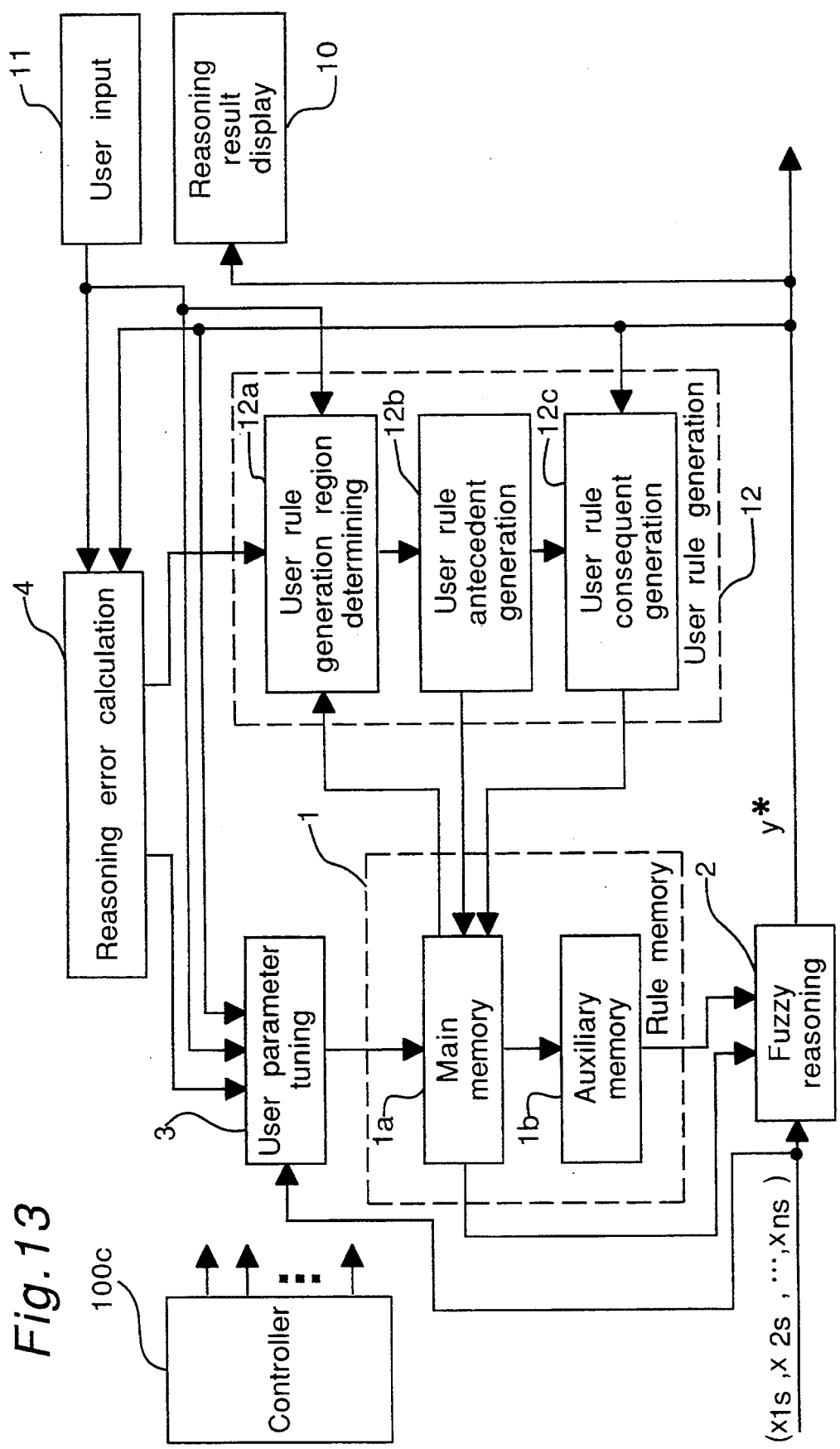
FIG. 13 is a schematic block diagram showing an apparatus for automatically generating fuzzy reasoning rules of a third preferred embodiment according to the present invention.

FIG. 13 shows an apparatus for automatically generating fuzzy reasoning rules of a third preferred embodiment according to the present invention. In FIG. 13, sections similar to those shown in FIG. 1 are denoted the same numerals shown in FIG. 1.

As compared with the apparatus of the first preferred embodiment shown in FIG. 1, the apparatus of the third preferred embodiment is characterized in further comprising:

(a) a reasoning result display section 10 for displaying outputs of the fuzzy reasoning section 2, such as a CRT display unit or the like;

(b) a user input section 11 for inputting user's alternation instructions and judgments for alternating the displayed contents in response to the contents displayed on the reasoning result display section 2;

(c) a user rule generation section 12 for newly generating fuzzy reasoning rules in response to the user's alternation instructions and judgments inputted using the user input section 11; and (d) a user parameter tuning section 13 for adjusting values of parameters of fuzzy reasoning rules stored in the main memory 1a after being generated by the user rule generation section 12.

Further, the user rule generation section comprises:

(a) a user rule generation region determining section 12a for determining a region for newly generating fuzzy resoning rules referring to the rules stored in the main memory 1a when alternation instructions or judgments are inputted through the user input section 11;

(b) a user rule antecedent generation section 12b for newly generating new membership functions in the region determined by the user rule generation region determining section 12a so that the new membership functions have values of parameters indicating the shape thereof and for renewing the antecedents of the fuzzy resoning rules stored in the main memory 1a; and (c) a user rule consequent generation section 12c for renewing the values of the parameters of the consequents of the fuzzy reasoning rules stored in the main memory 1a based on the results of the fuzzy reasoning process performed by the fuzzy resoning section 2 using the rules stored in the auxiliary memory 1b from the values of the parameters of the antecedents of the fuzzy reasoning rules stored in the main memory 1a renewed by the user rule antecedent generation section 12b.

Figure 14A:
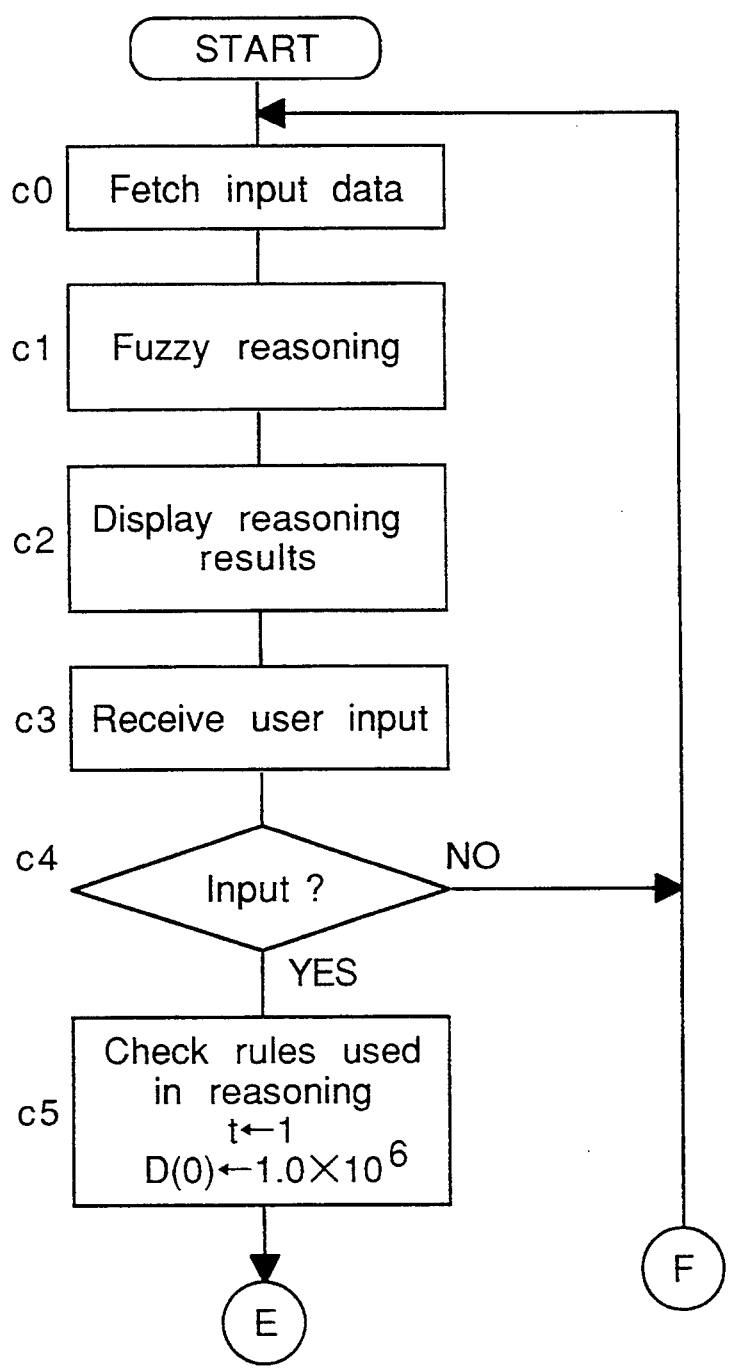
FIGS. 14a and 14b are flow charts showing an automatic rule generation and tuning process of the apparatus shown in FIG. 13.
Figure 14B:
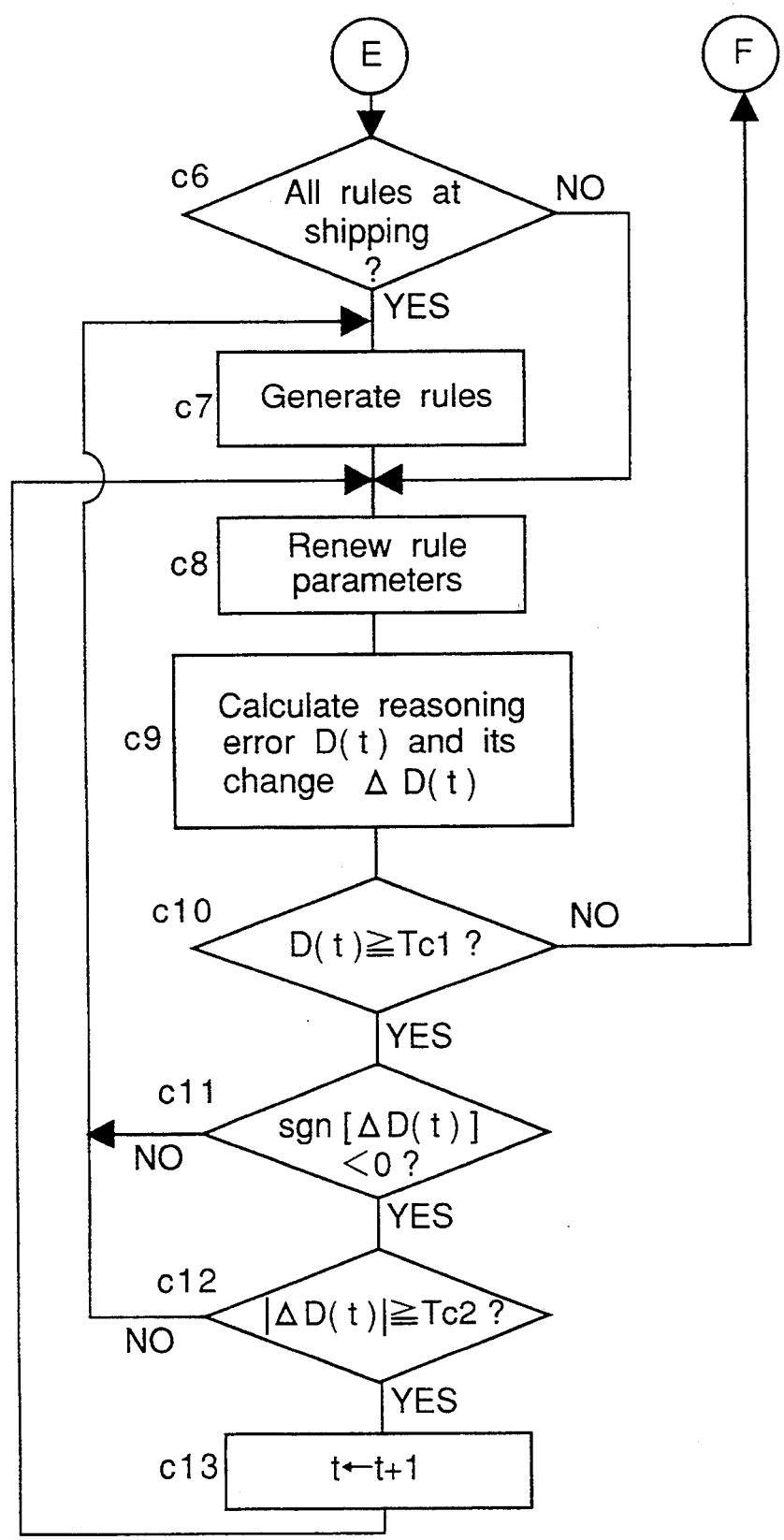

An automatic rule generation and tuning process performed by the apparatus shown in FIG. 13 will be described below with reference to FIGS. 14a and 14b.

For the sake of a concrete description, an automatic washing machine is supposed to be equipped with predetermined fuzzy reasoning rules given at its shipping by experts. The following description shows how the apparatus of the third preferred embodiment according to the present invention newly generates fuzzy reasoning rules which reflect the user's instructions and judgement on the basis of the predetermined fuzzy reasoning rules given by the experts.

A washing time automatically set by a conventional fully automatic washing machine is determined based on change in a transmittance of washing water detected by a photo-sensor or the other means, a saturation time thereof or the like. If the washing time, the change in the transmittance of washing water and the saturation time thereof are labelled as y, $x_1$ and $x_2$, respectively, the relationship therebetween is expressed by the following fuzzy reasoning rules:

$R^0$: IF $x_1$ is $A_{10}$ and $x_2$ is $A_{20}$ THEN $y$ is $w_0$ $R^1$: IF $x_1$ is $A_{10}$ and $x_2$ is $A_{20}$ THEN $y$ is $w_1$ $R^k$: IF $X_1$ is $A_{1j}1$ and $x_2j2$ THEN $y$ is $w_k$ (21).

The washing machine of the present preferred embodiment is equipped with standard fuzzy reasoning rules which are expressed by (21) and are given at its shipping by the experts. It is to be noted that there is further provided a controller 100c for controlling the respective sections shown in FIG. 13, and the controller 100c performs respective processes of steps other than those performed by the sections indicated at the following steps.

Step c0

Step c0 fetches a change $x_1$ in the transmittance of the washing water detected by the photo-sensor provided in the washing machine and a saturation time $x_2$ thereof, as input data ($x_{1s}$, $x_{2s}$).

Step c1

The fuzzy reasoning section 2 performs a fuzzy reasoning process for the input data ($x_{1s}$, $x_{2s}$) fetched at step c0, based on predetermined fuzzy reasoning rules stored in the rule memory 1, thereby obtaining a washing time $y^*$ of the outputs of the reasoning results.

Step c2

The reasoning display section 10 displays the washing time $y^*$ of the output from the fuzzy reasoning section 2.

Step c3

The user input section 11 waits for the user's input for a predetermined time. An operator of the user enters an appropriate washing time $y^r$ which the operator judges in response to the washing time $y^*$ displayed by the reasoning result display section 10. For example, if an estimated washing time of 7 minutes is displayed thereon and the operator wishes to set a washing time longer than the estimated washing time, the operator enter a longer washing time such as ten minutes or the like.

Step c4

Step c4 checks whether or not the operator has inputted a washing time. If the operator has not inputted any washing time (NO at step c4), it is judged by the controller 100c that the fuzzy reasoning rules used for determining the current washing time fully represents the user's know-how, and then, the flow goes back step c0. Then, the controller 100c waits for start of the next washing process.

On the other hand, if the operator has inputted a washing time (YES at step c4), the flow goes to step c5.

Step c5 and c6

Step c5 checks the history of the fuzzy reasoning rules stored in the rule main memory 1a. At step c5, the serial number t of the tuning cycle is initially reset to one, and also the initial value D(0) of the change D(t) in the reasoning error is set to an enough-large value of $1.0 \times 10^6$ in a manner similar to that of each of the first and second preferred embodiments.

If the currently used fuzzy reasoning rules are all the fuzzy reasoning rules set at shipping, or if there are some fuzzy reasoning rules generated in response to the user's past input but there is no parameter to be adjusted (YES at step c6), the flow goes to step c7. On the other hand, if there is at least one fuzzy reasoning rule generated in response to the user's past input and there are at least one parameters to be adjusted, the flow goes to step c8.

Step c7

The user rule generation section 12 generates at least one fuzzy reasoning rule for a region to which input data ($x_{1s}$, $x_{2s}$) belong, wherein the input data ($x_{1s}$, $x_{2s}$) are obtained at step c0. Step c7 is performed in a manner similar to that of steps b12 to b14 of the second preferred embodiment.

Step c8

The user parameter tuning section 13 renews the values of the parameters of the fuzzy reasoning rules, using the input and output data ($x_{1s}$, $x_{2s}$, $y^r$) wherein the input data ($x_{1s}$, $x_{2s}$) are obtained at step c0 and the output data $y^r$ are data inputted through the user input section 11 by the operator. Step c8 is performed basically in a manner similar to that of step b6 of the second preferred embodiment.

In the processes of steps C7 and C8, there are adjusted the parameters of only the fuzzy resoning rules newly generated based on data inputted by the operator, except for the parameters on the boundaries between respective regions. Therefore, the performance of fuzzy reasoning rules set at shipping by experts are not damaged for the regions which the above input and output data ($x_{1s}$, $x_{2s}$, $y^r$) do not belong to or they are not inputted into.

Step c9

Step c9 calculates a reasoning error D(t) between the output $y^*$ obtained by the above-mentioned fuzzy reasoning process based on the input data ($x_{1s}$, $x_{2s}$), and the output $y^r$ from the user input section 11.

Step c10 to c13

Step c10 checks whether or not the reasoning error D(t) calculated at step c9 is smaller than a predetermined threshold value Tc1. Steps c10 to c12 are performed in manners similar to those of steps a8 to a10 of the first preferred embodiment. It is to be noted that step c12 checks the absolute value $|D(t)|$ of the change in the reasoning error is equal to or larger than a predetermined threshold value Tc2.

If the reasoning error D(t) is equal to or larger than the threshold value Tc1 (YES at step c10), the process of step c7 and/or the process of step c8 are repeatedly performed until the reasoning error D(t) is smaller than the threshold value Tc1 (NO at step c10). If NO at step c11 or NO at step c12, the flow goes to step c7. Further, if YES at step c11 and YES at step c12, the serial number t of the tuning cycle is incremented by one at step c13, and then, the flow goes to step c8.

On the other hand, if the reasoning error D(t) is smaller than the predetermined threshold value Tc1, the flow goes back to step c0, and then, the controller 100c waits for start of the next washing process.

According to the third preferred embodiment, alternation instructions and judgments are inputted through the user input section 11 for the outputs of the results of the fuzzy reasoning process, and there are automatically generated fuzzy reasoning rules including the user's know-how indicated by the alternation instructions and the judgments. Therefore, as the operator enters alternation instructions and judgments of his know-how many times, there can be obtained an apparatus capable of operating according to his know-how. Further, since the apparatus of the present preferred embodiment adjusts the parameters of only the rules which have been generated in response to the alternation instructions and the judgments entered by the operator except for the parameters located on the boundaries between respective regions, the performance of the fuzzy reasoning rules; stored at its shipping by the experts can not be damaged in regions into which the operator does not enter data of the alternation instructions and judgments.

In the third preferred embodiment, the automatic washing machine is described above, however, the present invention is not limited to this. The present invention can be applied to various kinds of apparatus or units.

Fourth preferred embodiment

Figure 15:
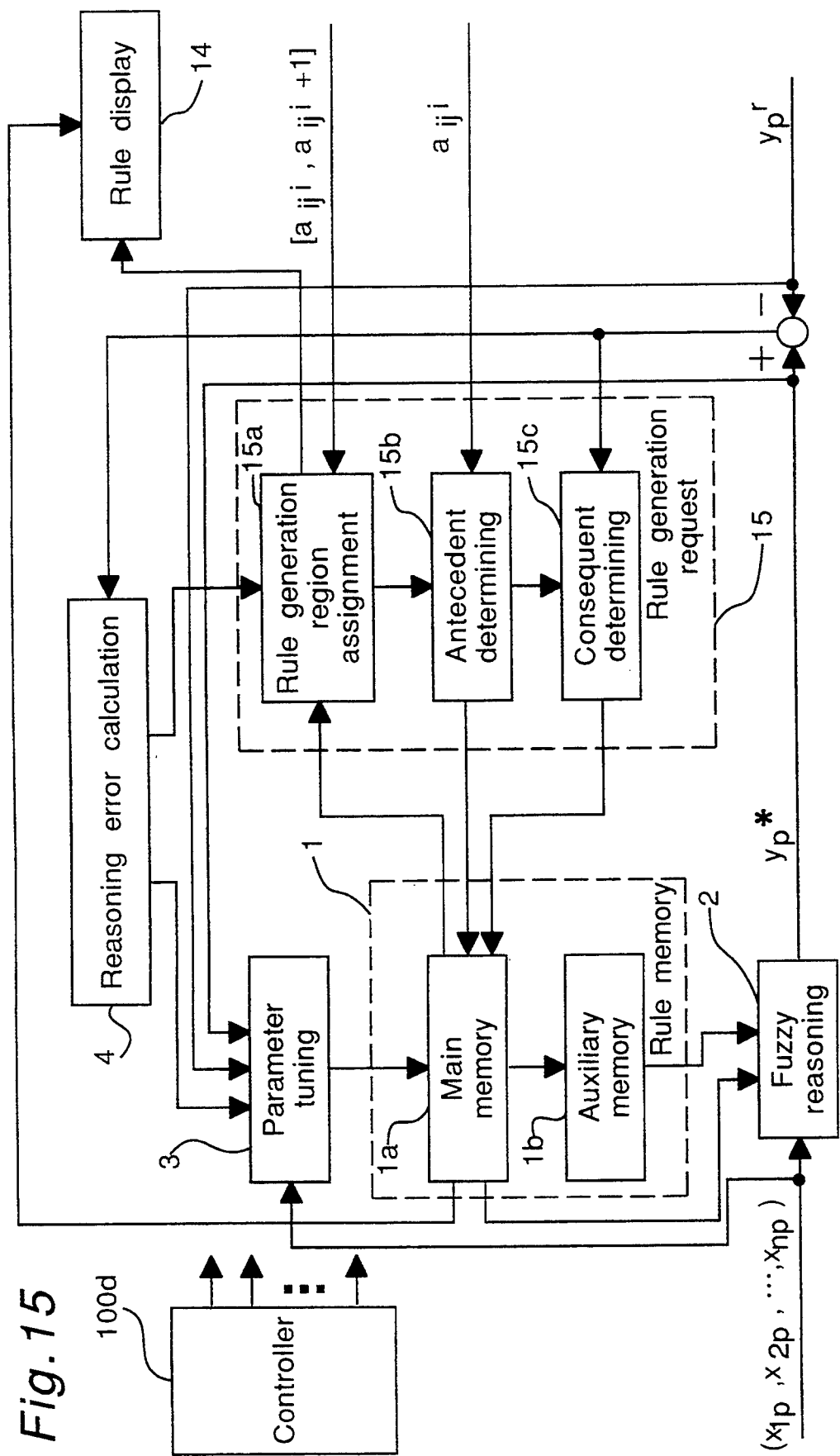
FIG. 15 is a schematic block diagram showing an apparatus for automatically generating fuzzy reasoning rules of a fourth preferred embodiment according to the present invention.

FIG. 15 shows an apparatus for automatically generating fuzzy reasoning rules of a fourth preferred embodiment according to the present invention. In FIG. 15, sections similar to those shown in FIG. 1 are denoted the same numerals shown in FIG. 1.

As compared with the apparatus of the first preferred embodiment shown in FIG. 1, the apparatus of the fourth preferred embodiment is characterized in further comprising:

(a) a rule display section 14 for displaying fuzzy reasoning rules stored in the rule main memory 1a, such as a CRT display unit or the like; and (b) a rule generation request section 15 for displaying on the rule display section 14 requesting a designer or an operator to newly generate fuzzy reasoning rules when the reasoning error D(t) calculated by the reasoning error calculation section 4 is equal to or larger than a predetermined threshold value Td1 and the absolute value $|\Delta D(t)|$ of the change in the reasoning error is equal to or smaller than a predetermined threshold value Td2.

Further, the rule generation request section 15 comprises:

(a) a rule generation region assignment section 15a for assigning or specifying a region for newly generating fuzzy reasoning rules;

(b) an antecedent determining section 15b for receiving data of values of parameters representing shapes of membership functions of the antecedents generated for the region assigned by the rule generation region assignment section 15a, and for renewing and determining the antecedents of the fuzzy reasoning rules stored in the main memory 1a based on the received data; and (c) a consequent determining section 15c for renewing and determining values of parameters of the consequents stored in the main memory 1a, using the parameters of the antecedents of the fuzzy reasoning rules stored in the main memory 1a after being renewed by the antecedent determining section 15b, based on results of the fuzzy resoning process performed by the fuzzy reasoning section 2 using the auxiliary memory 1b.

Figure 16A:
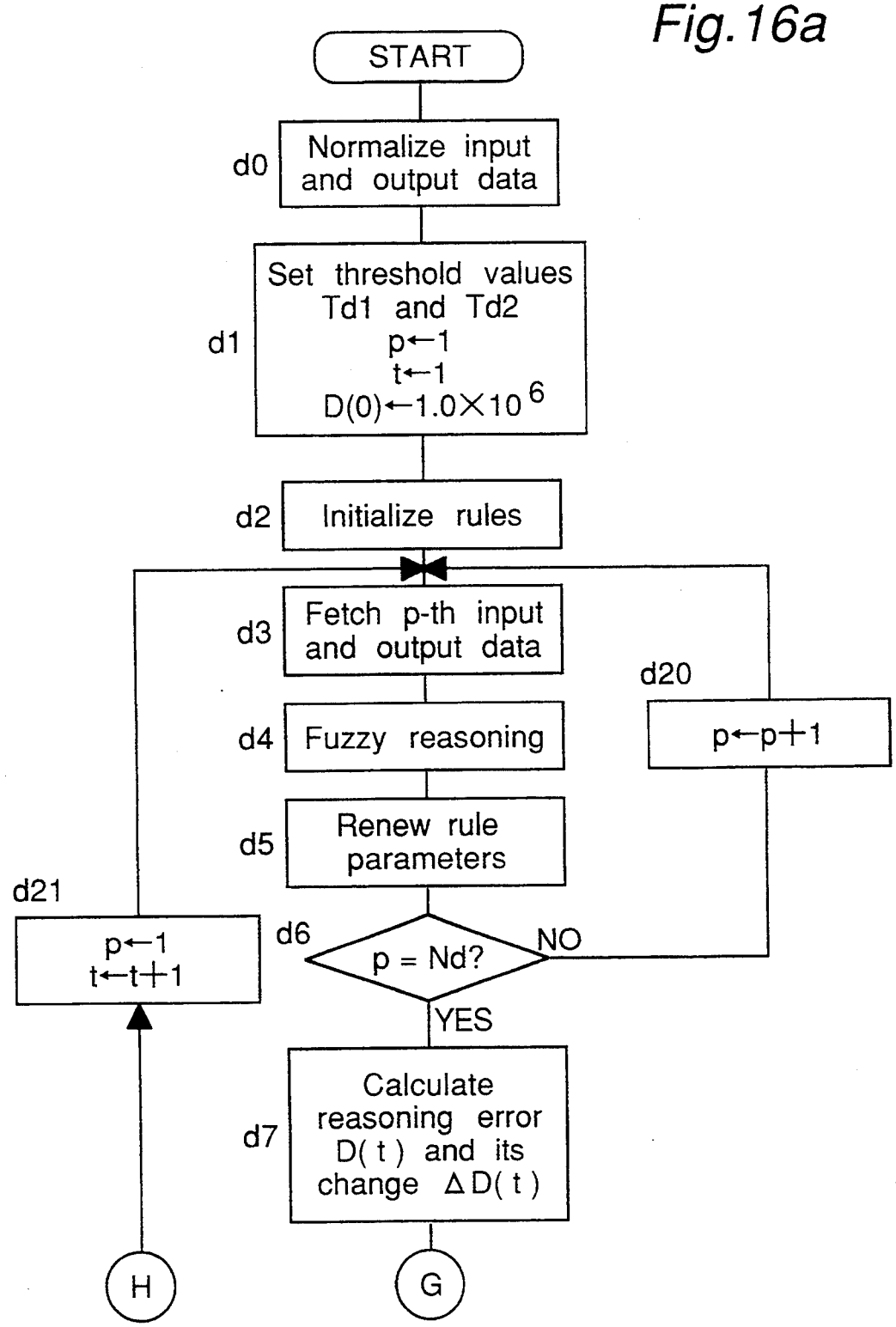
FIGS. 16a and 16b are flow charts showing an automatic rule generation and tuning process of the apparatus shown in FIG. 15.
Figure 16B:
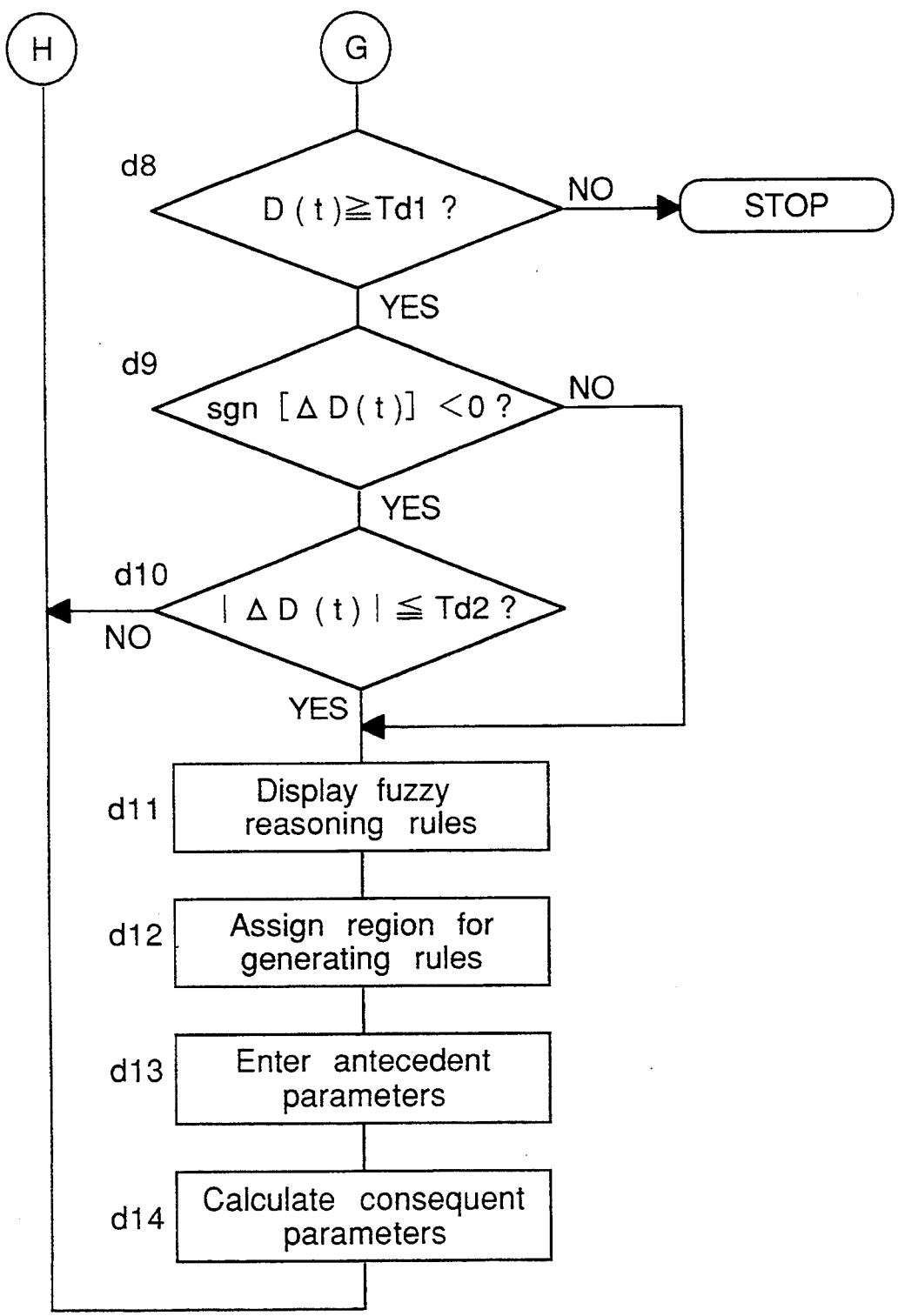

An automatic rule generation and tuning process executed by the apparatus shown in FIG. 15 will be described below with reference to flow charts shown in FIGS. 16a and 16b. It is to be noted that there is further provided a controller 100d for controlling the respective sections shown in FIG. 15 and the controller 100d performs respective processes of steps other than those performed by the sections indicated at the following steps.

As compared with the process of the first preferred embodiment, the process of the fourth preferred embodiment is characterized in including a step of outputting a request for generating fuzzy resoning rules from the rule generation request section 15 when the reasoning error calculated based on the current fuzzy reasoning rules does not decreases. In response to the request therefrom, the designer or the operator newly generates fuzzy reasoning rules in any region with reference to the current fuzzy reasoning rules displayed on the rule display section 14.

The processes of steps d0 to d10 are performed in manners similar to those of steps a0 to a10 of the first preferred embodiment. It is to be noted that the predetermined threshold values Td1 and Td2 are set at step d1.

Step d11

The rule display section 14 displays fuzzy reasoning rules stored in the rule main memory 1a, and the rule generation region assignment section 15a displays on the rule display section 14 requesting a designer or an operator to newly generate fuzzy reasoning rules.

Step d12

The operator decides a region for newly generating fuzzy reasoning rules with reference to the fuzzy reasoning rules displayed on the rule display section 14, and enters an interval $[a_{ij}i, a_{ij}i+1]$ composed of values of parameters of the antecedents, such as $[a_{32}, a_{33}]$.

Step d13

There are inputted values of parameters of the fuzzy reasoning rules to be newly generated using values within the interval determined at step d12 by the operator. When values are inputted, first of all, the fuzzy reasoning rules stored in the rule main memory 1a are transferred or copied into the auxiliary, memory 1b, and then, the values of the parameters of the antecedents of the fuzzy reasoning rules stored in the rule main memory 1a are renewed based on the inputted values of the parameters.

Step d14

The process of step d14 is performed in a manner similar to that of step a13 of the first preferred embodiment as follows. There is performed a fuzzy reasoning process every rule, using the fuzzy reasoning rules prior to the renewal thereof which have been copied into the rule auxiliary memory 1b at step d13, based the values of parameters of the antecedents of the fuzzy reasoning rules renewed at step d13. Then, based on the resulting values of the parameters of the consequents of the renewed fuzzy reasoning rules, the values of the parameters of the consequents of the fuzzy reasoning rules are renewed.

After renewal of the consequents, the data number p of the input and output data is initially reset to zero and also the serial number t of the tuning cycle is incremented by one at step d21, and then, the flow goes back to step d3.

In the first preferred embodiment, generation of the fuzzy reasoning rules and adjustment of the values of the parameters are automatically performed, and the former process is performed based on only the reasoning error calculated by each of the regions divided by the two membership functions adjacent to each other. As a result, there can be obtained optical fuzzy reasoning rules having the minimum reasoning error. However, the obtained fuzzy reasoning rules might be practically unreasonable.

In order to solve the above-mentioned problems, there is provided the apparatus of the fourth preferred embodiment. In this apparatus, the operator can freely generate rules as he intends to set them more optimally, with reference to the fuzzy reasoning rules displayed on the rule display section 14, in response to the request from the rule generation request section 15. Therefore, unreasonable rules that are optimal only in terms of the reasoning error can be avoided by the apparatus of the fourth preferred embodiment. Further, the development time can be shortened since the operator can heuristically decide a region for newly generating fuzzy reasoning rules.

Fifth preferred embodiment

Figure 17:
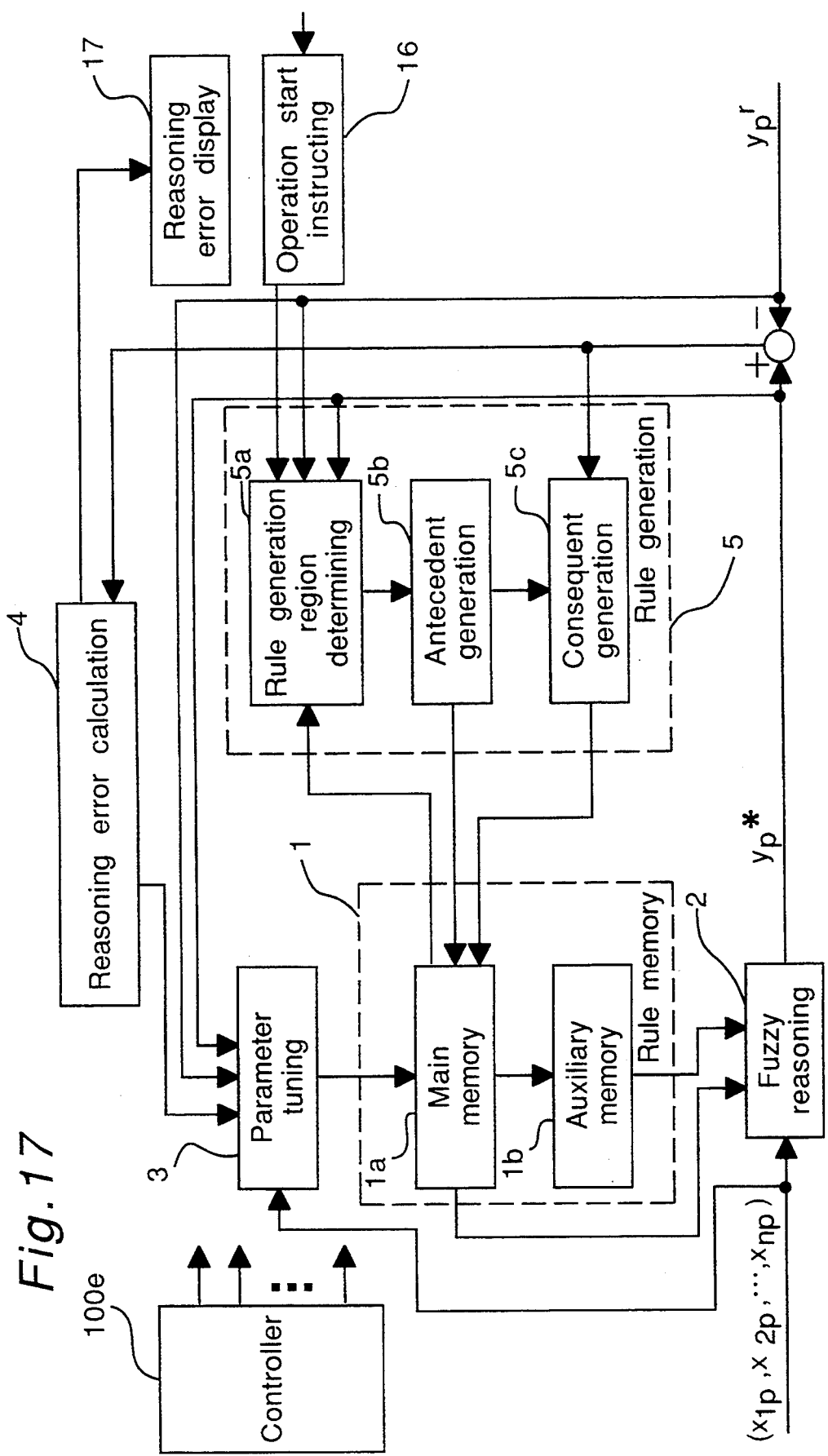
FIG. 17 is a schematic block diagram showing an apparatus for automatically generating fuzzy reasoning rules of a fifth preferred embodiment according to the present invention.

FIG. 17 shows an apparatus for automatically generating fuzzy reasoning rules of a fifth preferred embodiment according to the present invention. In FIG. 17, sections similar to those shown in FIG. 1 are denoted the same numerals shown in FIG. 1.

As compared with the apparatus of the first preferred embodiment shown in FIG. 1, the apparatus of the fifth preferred embodiment is characterized in further comprising:

(a) an operation start instructing section 16 for instructing the rule generation section 5 to start the operation thereof such as an instruction key or the like; and (b) a reasoning error display section 17 for displaying a reasoning error D(t) and its change ΔD(t). In the present preferred-embodiment, a signal line connected from the reasoning error calculation section 4 to the rule generation section 5 is removed in FIG. 17.

Figure 18A:
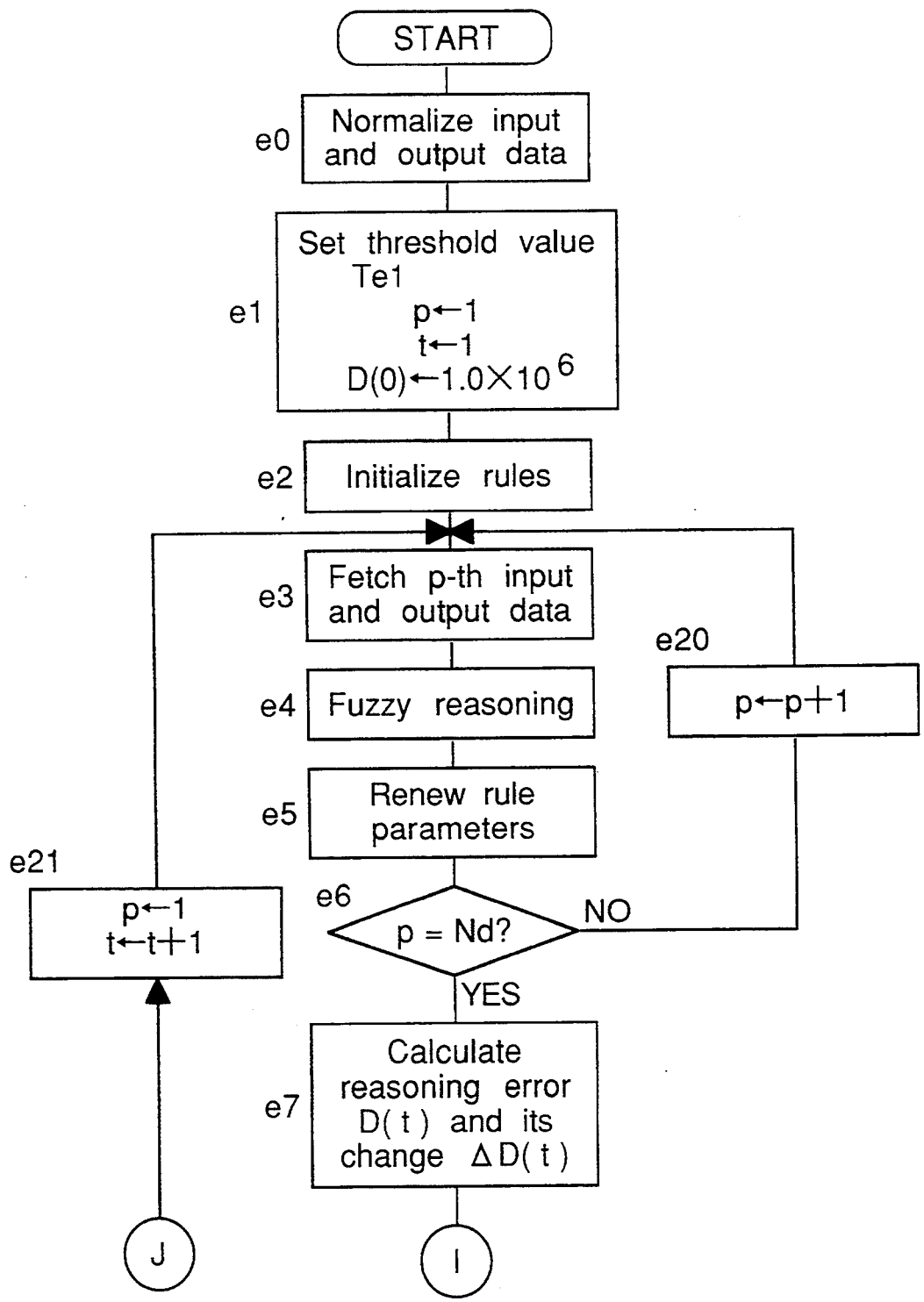
FIGS. 18a and 18b are flow charts showing an automatic rule generation and tuning process of the apparatus shown in FIG. 17.
Figure 18B:
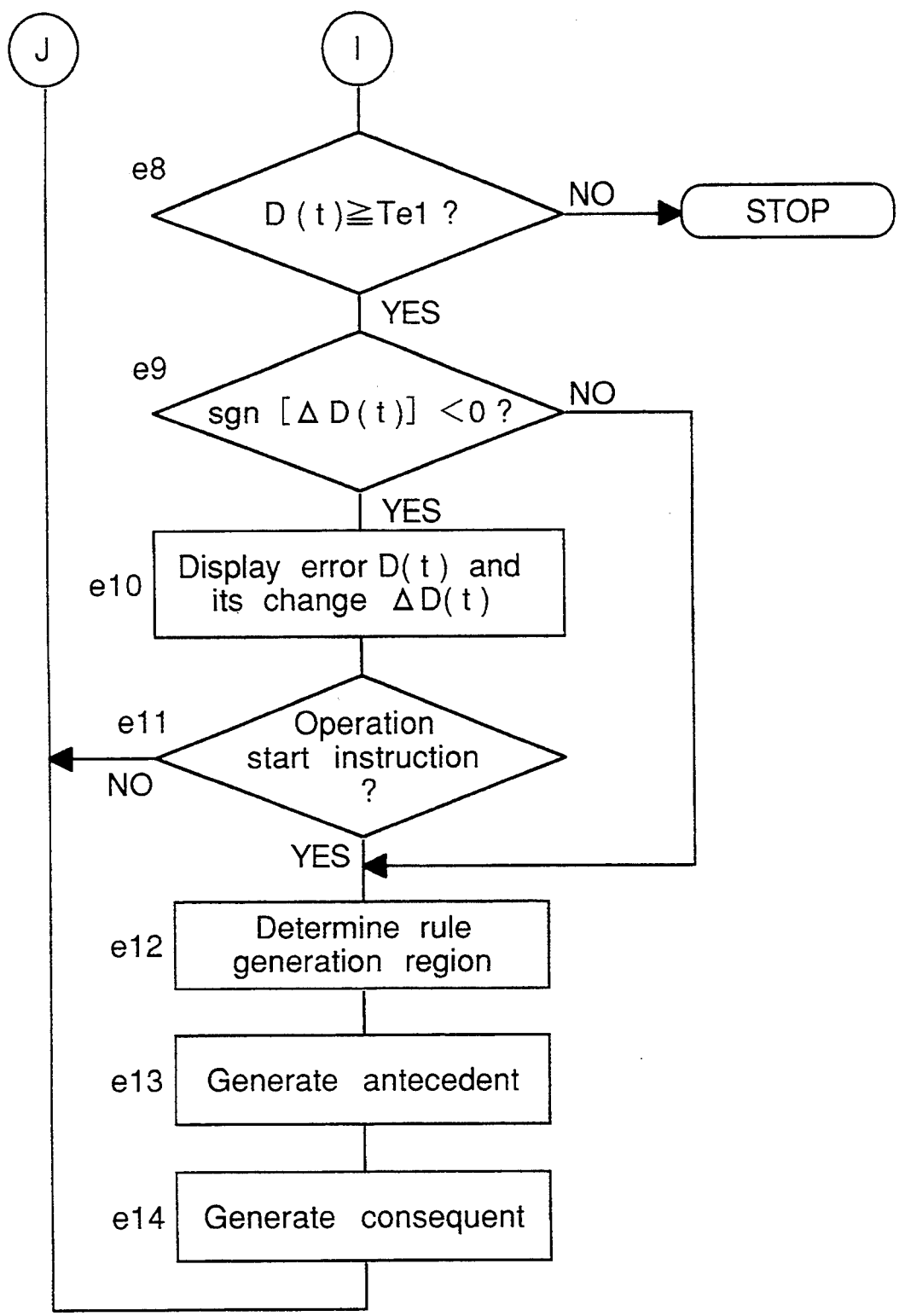

An automatic rule generation and tuning process executed by the apparatus shown in FIG. 17 will be described below with reference to flow charts shown in FIGS. 18a and 18b. It is to be noted that there is further provided a controller 100e for controlling the respective sections shown in FIG. 17, and the controller 100e performs respective processes of steps other than those performed by the sections indicated at the following steps.

As compared with the process of the first preferred embodiment, the process of the fifth preferred embodiment is characterized that the operator instructs the rule generation section 5 to start the operation thereof using the operation start instruction section 16, with reference to the contents displayed on the reasoning error. display section 17 at the end timing of any tuning cycle in the process for generating fuzzy reasoning rules, without starting the operation of the rule generation section 5.

The processes of steps e0 to e8 are performed in manners similar to those of steps a0 to a8 of the first preferred embodiment. It is to be noted that any threshold value Te2 for starting the operation of the rule generation section 5 is not set at step e1.

Step e9

Step e9 checks a sign of the change ΔD(t) in the reasoning error D(t). If the change ΔD(t) is positive or zero, or if the change D(t) has increased or has not changed, it is judged that the reasoning error does not decrease in the case of the current fuzzy reasoning rules, and the flow goes to step e12 which determines a regions for newly generating fuzzy reasoning rules. On the other hand, If the change ΔD(t) is negative, or if the change D(t) has decreased, the flow goes to step e10.

In the present preferred embodiment, there is provided step e9, however, step e9 may not provided in the process.

Step e10

The reasoning error display section 17 displays the reasoning error D(t) and its change ΔD(t).

Step e11

Step e11 checks whether or not the operator instructs the rule generation section 5 to start the operation thereof. If the operator does not instruct (NO at step e11), the data number p of the input and output data is initially reset to one and also the serial number of tuning cycle t is incremented by one at step e21, and then, the flow goes back to step e3. On the other hand, the operator instructs, the flow goes to step e12 which determines a region for newly generating fuzzy reasoning rules.

The processes of steps e12 to e14 are performed in manners similar to those of steps a11 to a13 of the first preferred embodiment.

In the first preferred embodiment, a .fixed threshold value is used for judgement on starting generation of fuzzy reasoning rules. Therefore, adjustment with almost no change in the values of parameters is repeated since the change $\Delta D(t)$ of the reasoning error reaches the threshold value Ta2.

On the other hand, in the fifth preferred embodiment, the operator can instruct the rule generation section 5 to start the operation thereof at the end timing of any tuning cycle using the operation start instructing section 16, with reference to the reasoning error $D(t)$ and its change $\Delta D(t)$ displayed on the reasoning error display section 17. Therefore, adjustment with almost no change in the values of parameters can be prevented from being repeated. According to the developing time for developing the fuzzy reasoning rules can be shortened.

Further, in the case where step e9 is omitted and no instruction is inputted to the operation start instructing section 16, only the parameter tuning section 3 can be independently used. Therefore, the apparatus of the fifth preferred embodiment can be used a general use type tuning apparatus without alternating the composition thereof even though the number of fuzzy reasoning rules is determined.

Further, the operation start instructing Section 16 and the reasoning error display section 17 may be added to the apparatus of the fourth preferred embodiment. In this case, the apparatus thereof can be used as a tool for freely generating fuzzy seasoning rules by the designer or the operator.

Although the present inventions have been fully described in connection with the preferred embodiments thereof with reference to the accompanying drawings, it is to be noted that various changes and modifications are apparent to those skilled in the art. Such changes and modifications are to be understood as included within the scope of the present inventions as defined by the appended claims unless they depart therefrom.

What is claimed is:

1. A method for automatically generating fuzzy reasoning rules which is performed by a controller apparatus, including the steps of:

performing a fuzzy reasoning process based on rule parameters of membership functions constituting fuzzy reasoning rules representing relationships between input data and output data stored in a rule memory for storing rule parameters of membership functions constituting fuzzy reasoning rules and outputting results of said fuzzy reasoning process, each of said fuzzy reasoning rules being composed of antecedents and consequents;

calculating a reasoning error and a change in the reasoning error to obtain a calculated reasoning error and a calculated change based on the results of said fuzzy reasoning process and said plurality of pairs of predetermined input and output data;

adjusting said rule parameters of membership functions constituting said fuzzy reasoning rules stored in said rule memory, based on the results of said fuzzy reasoning process and a plurality of pairs of predetermined input and output data for said fuzzy reasoning process which are predetermined by a rule designer, when said calculated change is larger than a predetermined first threshold value;

generating new rule parameters of membership functions constituting fuzzy reasoning rules and storing said new generated rule parameters of membership functions constituting said fuzzy reasoning rules in said rule memory, when said calculated change in the reasoning error is equal or smaller than said predetermined first threshold value; and alternately adjusting and generating rule parameters repeatedly until said calculated reasoning error is equal to or smaller than a predetermined second threshold value.

2. The method as claimed in claim 1,
wherein said newly generating rule parameters step includes the steps of:

determining a region for generating fuzzy reasoning rules, said region being defined by said input data;

generating membership functions of antecedents of fuzzy reasoning rules in said determined region, and storing rule parameters of said generated membership functions of the antecedents of the fuzzy reasoning rules in said rule memory; and generating membership functions of consequents of fuzzy reasoning rules based on the antecedents of the fuzzy reasoning rules stored in said rule memory, and storing rule parameters of said generated membership functions of the consequents of the fuzzy reasoning rules in said rule memory.

3. A method for automatically generating fuzzy reasoning rules which is performed by a controller apparatus, including the steps of:

performing a fuzzy reasoning process based on rule parameters of membership functions constituting fuzzy reasoning rules representing relationships between input data and output data stored in a rule memory for storing rule parameters of membership functions constituting fuzzy reasoning rules and outputting results of said fuzzy reasoning process, each of said fuzzy reasoning rules being composed of antecedents and consequents;

selecting a region for generating new fuzzy reasoning rules for a plurality of pairs of predetermined input and output data for said fuzzy reasoning process which are predetermined by a rule designer, said region being defined by input data and output data;

omitting at least one pair of input and output data belonging to regions among said plurality of pairs of predetermined input and output data other than said selected regions;

calculating a reasoning error and a change in said reasoning error to obtain a calculated reasoning error and a calculated change based on the results of said fuzzy reasoning process and said plurality of pairs of predetermined input and output data;

adjusting said rule parameters of membership functions constituting said fuzzy reasoning rules located in said selected regions, based on the results of said fuzzy reasoning process and said plurality of pairs of predetermined input and output data, when said calculated change is larger than a predetermined first threshold value;

generating new rule parameters of membership functions constituting said fuzzy reasoning rules in said selected regions and storing said new generated rule parameters of membership functions constituting said fuzzy reasoning rules in said rule memory, when said calculated change is equal to or smaller than said predetermined first threshold value; and alternately adjusting and generating rule parameters repeatedly until said calculated reasoning error is equal to or smaller than a predetermined second threshold value.

4. The method as claimed in claim 3, wherein generating new rule parameters includes the steps of:

determining a region for generating fuzzy reasoning rules in said region determined by said selecting region step;

generating membership functions of antecedents of fuzzy reasoning rules in said determined region, and storing rule parameters of said generated membership functions of the antecedents of the fuzzy reasoning rules in said rule memory; and generating membership functions of consequents of fuzzy reasoning rules based on the antecedents of the fuzzy reasoning rules stored in said rule memory, and storing rule parameters of said generated membership functions of the consequents of the fuzzy reasoning rules in said rule memory.

5. A method for automatically generating fuzzy reasoning rules which is performed by a controller apparatus, including the steps of:

performing a fuzzy reasoning process based on rule parameters of membership functions constituting fuzzy reasoning rules representing relationships between input data and output data stored in a rule memory for storing rule parameters of membership functions constituting fuzzy reasoning rules and outputting results of said fuzzy reasoning process, each of said fuzzy reasoning rules being composed of antecedents and consequents;

displaying the results of said fuzzy reasoning process;

inputting a plurality of pairs of further input and output data for said fuzzy reasoning process based on said displayed results of said fuzzy reasoning process;

generating new rule parameters of membership functions constituting fuzzy reasoning rules in response to said input plurality of pairs of further input and output data;

adjusting said new rule parameters;

calculating a reasoning error based on the results of said fuzzy reasoning process and said input plurality of pairs of further input and output data for said fuzzy reasoning process; and alternately performing said adjusting and said generating of rule parameters repeatedly until said calculated reasoning error is equal to or smaller than a predetermined first threshold value; and wherein said generating new rule parameters includes the steps of:

determining a region for generating fuzzy reasoning rules in response to said input plurality of pairs of further input and output data for said fuzzy reasoning process, said region being defined by said input data;

generating membership functions of antecedents of fuzzy reasoning rules in said determined region, and storing rule parameters of said generated membership functions of the antecedents of the fuzzy reasoning rules in said rule memory; and generating membership functions of consequents of fuzzy reasoning rules based on the antecedents of the fuzzy reasoning rules stored in said rule memory, and storing rule parameters of said generated membership functions of the consequents of the fuzzy reasoning rules in said rule memory.

6. A method for automatically generating fuzzy reasoning rules which is performed by a controller apparatus, including the steps of:

performing a fuzzy reasoning process based on rule parameters of membership functions constituting fuzzy reasoning rules representing relationships between input data and output data stored in a rule memory for storing rule parameters of membership functions constituting fuzzy reasoning rules and outputting results of said fuzzy reasoning process, each of said fuzzy reasoning rules being composed of antecedents and consequents;

calculating a reasoning error and a change in the reasoning error so as to obtain a calculated reasoning error and a calculated change based on the results of said fuzzy reasoning process and said plurality of pairs of predetermined input and output data;

displaying said fuzzy reasoning rules stored in said rule memory;

adjusting said rule parameters of membership functions constituting said fuzzy reasoning rules stored in said rule memory, based on the results of said fuzzy reasoning process and a plurality of pairs of predetermined input and output data for said fuzzy reasoning process which are determined by a rule designer, when said calculated change is larger than a predetermined first threshold value;

displaying a request to the operator for generating fuzzy reasoning rules when said calculated change in the reasoning error is equal to or smaller than said predetermined first threshold value; and alternately performing said adjusting rule parameters step and said displaying a request step repeatedly until said reasoning error is equal to or smaller than a predetermined second threshold value; and wherein said displaying a request step includes the steps of:

determining a region for generating fuzzy reasoning rules, said region being defined by said input data;

generating membership functions of antecedents of fuzzy reasoning rules in said determined region, and storing rule parameters of said generated membership functions of the antecedents of the fuzzy reasoning rules in said rule memory; and generating membership functions of consequents of fuzzy reasoning rules based on the antecedents of the fuzzy reasoning rules stored in said rule memory, and storing rule parameters of said generated membership functions of the consequents of the fuzzy reasoning rules in said rule memory.

* * * * *

UNITED STATES PATENT AND TRADEMARK OFFICE
CERTIFICATE OF CORRECTION

PATENT NO. : 5,440,672

DATED : August 8, 1995

INVENTOR(S) : Shoichi Araki et al.

It is certified that error appears in the above-identified patent and that said Letters Patent is hereby corrected as shown below:

Title Page, Abstract, Line 6, "the a" should read --the--.

Column 1, Line 24: "iterative" should read --interactive--.

Column 1, Line 47: "inventions" should read --invention--.

Column 1, Line 57: "inventions" should read --invention--.

Column 1, Line 68: "inventions," should read --invention,--.

Column 4, Line 34: "inventions" should read --invention--.

Column 6, Line 41: "not;" should read --not--.

Column 6, Line 61: "inventions" should read --invention--.

Column 7, Line 33: "an-example" should read --an example--.

Column 9, Line 52: "data-number" should read --data number--.

Column 9, Line 60: "as-a" should read --as a--.

Column 10, Line 48: "all" should read --all--.

Column 10, Line 64: "5 in" should read --5. In--.

Column 11, Line 14: "resoning" should read --reasoning--.

Column 11, Line 35: "all" should read --all--.

Column 11, Line 49: "50" should read --5c--.

Column 11, Line 54: "resoning" should read --reasoning--.

UNITED STATES PATENT AND TRADEMARK OFFICE
CERTIFICATE OF CORRECTION

PATENT NO. : 5,440,672
DATED : August 8, 1995
INVENTOR(S) : Shoichi Araki et al.

It is certified that error appears in the above-indentified patent and that said Letters Patent is hereby corrected as shown below:

Column 11, Line 56: "resoning" should read --reasoning--.

Column 12, Line 1: "resoning" should read --reasoning--.

Column 12, Line 5: "of" should read --of the--.

Column 12, Line 24: "$y^* - (-x_1+1)w_0 + x_1 w_1 \quad (17)$." should read --$y^* = (-x_1+1)w_0 + x_1 w_1 \quad (17)$.--.

Column 12, Line 28: "resoning" should read --reasoning--.

Column 12, Line 37: "$y^{*\prime} = (-2x_1+1)w_0 2x_1(w_0+w_1)/2 = (-x_1+1)w_0 + x_1 - w_1 \quad (19)$" should read --$y^{*\prime} = (-2x_1+1)w_0 + 2x_1(w_0+w_1)/2 = (-x_1+1)w_0 + x_1 - w_1 \quad (19)$--.

Column 12, Line 43: "$y^* - y^{*\prime}$" should read --$y^* = y^{*\prime}$--.

Column 12, Line 55: "resorting" should read --reasoning--.

Column 12, Line 57: "resoning" should read --reasoning--.

Column 12, Line 59: "resoning" should read --reasoning--.

Column 12, Line 61: "resoning" should read --reasoning--.

Column 13, Line 6: "resoning" should read --reasoning--.

Column 13, Line 36: "resoning" should read --reasoning--.

Column 13, Line 41: "process," should read --process.--.

UNITED STATES PATENT AND TRADEMARK OFFICE
CERTIFICATE OF CORRECTION

PATENT NO. : 5,440,672
DATED : August 8, 1995
INVENTOR(S) : Shoichi Araki et al.

It is certified that error appears in the above-indentified patent and that said Letters Patent is hereby corrected as shown below:

Column 14, Line 4: "resoning" should read --reasoning--.

Column 14, Line 10: "resoning" should read --reasoning--.

Column 14, Line 24: "resoning" should read --reasoning--.

Column 14, Line 26: "resoning" should read --reasoning--.

Column 14, Line 28: "resoning" should read --reasoning--.

Column 14, Line 39: "resoning" should read --reasoning--.

Column 14, Line 41: "resoning" (both occurrences) should read --reasoning--.

Column 14, Line 66: "step" should read --Step--.

Column 15, Line 20/21: "resoning" should read --reasoning--.

Column 15, Line 23: "resoning" should read --reasoning--.

Column 15, Line 25: "resoning" should read --reasoning--.

Column 15, Line 39: "resoning" should read --reasoning--.

Column 16, Line 13: "resoning" should read --reasoning--.

Column 16, Line 15: "resoning" should read --reasoning--.

Column 16, Line 20: "resoning" should read --reasoning--.

Column 16, Line 22: "resoning" should read --reasoning--.

UNITED STATES PATENT AND TRADEMARK OFFICE
CERTIFICATE OF CORRECTION

PATENT NO. : 5,440,672
DATED : August 8, 1995
INVENTOR(S) : Shoichi Araki et al.

It is certified that error appears in the above-indentified patent and that said Letters Patent is hereby corrected as shown below:

Column 16, Line 37: "resoning" should read --reasoning--.

Column 16, Line 41: "resorting" should read --reasoning--.

Column 17, Line 3: "section" should read --section 12--.

Column 17, Line 6: "resoning" should read --reasoning--.

Column 17, Line 16: "resoning" should read --reasoning--.

Column 17, Line 22: "resoning" should read --reasoning--.

Column 17, Line 54: "$R^k$: IF $X_1$ is $A_{1j}1$ and $x_{2j}2$ THEN y is $W_k$" should read --$R^k$: IF $X_1$ is $A_{1j}1$ and $x_2$ is $A_{2j}2$ THEN y is $W_k$--.

Column 18, Line 45: "enough-large" should read --enough large--.

Column 19, Line 8: "resoning" should read --reasoning--.

Column 19, Line 61: "rules;" should read --rules--.

Column 20, Line 43: "resoning" should read --reasoning--.

Column 20, Line 58: "resoning" should read --reasoning--.

Column 20, Line 61: "decreases." should read --decrease.--.

Column 22, Line 56: "If" should read --if--.

Column 22, Line 59: "not" should read --not be--.

UNITED STATES PATENT AND TRADEMARK OFFICE
CERTIFICATE OF CORRECTION

PATENT NO. : 5,440,672
DATED : August 8, 1995
INVENTOR(S) : Shoichi Araki et al.

It is certified that error appears in the above-indentified patent and that said Letters Patent is hereby corrected as shown below:

Column 23, Line 41: "seasoning" should read --reasoning--.

Column 23, Line 43: "inventions" should read --invention--.

Column 23, Line 49: "inventions" should read --invention--.

Signed and Sealed this

Sixth Day of January, 1998

Attest:

BRUCE LEHMAN

Attesting Officer

Commissioner of Patents and Trademarks